(12) United States Patent
Kurokawa et al.

(10) Patent No.: US 7,645,058 B2
(45) Date of Patent: Jan. 12, 2010

(54) LIGHT DIFFUSING SHEET AND BACKLIGHT UNIT USING THE LIGHT DIFFUSING SHEET

(75) Inventors: Yuji Kurokawa, Osaka (JP); Yutaka Omura, Osaka (JP)

(73) Assignee: Takiron Co., Ltd., Osaka (JP)

( * ) Notice: Subject to any disclaimer, the term of this patent is extended or adjusted under 35 U.S.C. 154(b) by 0 days.

(21) Appl. No.: 10/590,605

(22) PCT Filed: Feb. 25, 2005

(86) PCT No.: PCT/JP2005/003112

§ 371 (c)(1),
(2), (4) Date: Aug. 24, 2006

(87) PCT Pub. No.: WO2005/083475

PCT Pub. Date: Sep. 9, 2005

(65) Prior Publication Data

US 2007/0171671 A1 Jul. 26, 2007

(30) Foreign Application Priority Data

Feb. 26, 2004 (JP) .............................. 2004-051017

(51) Int. Cl.
*F21V 7/04* (2006.01)
*F21V 5/00* (2006.01)
(52) U.S. Cl. ..................... 362/339; 362/620; 362/330
(58) Field of Classification Search .............. 362/558, 362/625, 626, 355, 619, 620, 339, 330, 224, 362/225, 606, 607; 313/501; 359/599, 619; 349/64, 65
See application file for complete search history.

(56) References Cited

U.S. PATENT DOCUMENTS

| 5,944,405 | A  | * | 8/1999 | Takeuchi et al. ............ 362/617 |
| 6,199,989 | B1 |   | 3/2001 | Maeda et al. |
| 6,485,157 | B2 | * | 11/2002 | Ohkawa ..................... 362/625 |
| 6,836,303 | B2 | * | 12/2004 | Kim ............................ 349/65 |

(Continued)

FOREIGN PATENT DOCUMENTS

FR          0/15352 A1     5/2003

(Continued)

OTHER PUBLICATIONS

International Search Report for PCT/JP05/003112 dated Jun. 21, 2005.

*Primary Examiner*—Bao Q Truong
(74) *Attorney, Agent, or Firm*—Sughrue Mion, PLLC

(57) ABSTRACT

To provide a light diffusing sheet which enables the light from a lightguide plate or light source of a backlight unit to be conducted to lens film after having been converted to diffused light having a small brightness peak angle, and which generates neither a moiré or interference fringe nor luminance unevenness, and is advantageous also in terms of productivity and cost, and to provide a backlight unit having this light diffusing sheet incorporated therein, and the surface of the sheet with fine recesses formed therein serves as a light emission side. The light diffusing sheet comprises a light-transmitting resin, characterized by having fine recesses formed in at least one of the surfaces thereof, the fine recesses having a shape which is any of the shapes of an inverted polyangular pyramid, an inverted truncated polyangular pyramid, an inverted cone, and an inverted truncated cone.

15 Claims, 9 Drawing Sheets

U.S. PATENT DOCUMENTS

| | | | |
|---|---|---|---|
| 7,108,414 B2 * | 9/2006 | McCollum et al. | 362/604 |
| 7,210,835 B2 * | 5/2007 | Chang et al. | 362/558 |
| 7,320,538 B2 * | 1/2008 | Ko et al. | 362/606 |
| 7,368,655 B2 * | 5/2008 | Blieske et al. | 136/246 |
| 2005/0039788 A1 | 2/2005 | Blieske et al. | |

FOREIGN PATENT DOCUMENTS

| | | |
|---|---|---|
| JP | 7-8805 A | 1/1995 |
| JP | 7-218705 A | 8/1995 |
| JP | 10-197951 | 7/1998 |
| JP | 2948796 B1 | 7/1999 |
| JP | 2002-48920 A | 2/2002 |
| JP | 2003-131009 A | 5/2003 |
| JP | 2003-215314 A | 7/2003 |
| JP | 2003-215717 A | 7/2003 |
| WO | WO 03/046617 A1 | 6/2003 |

* cited by examiner

LIGHT DIFFUSING SHEET AND BACKLIGHT UNIT USING THE LIGHT DIFFUSING SHEET

FIELD OF THE INVENTION

The present invention relates to a light diffusing sheet to be incorporated in the backlight unit of a liquid-crystal display for notebook type personal computers, personal computer monitors, television receivers, and the like, or in a screen for advertising signboards, illumination, or image displaying, or in an apparatus such as a scanner or copier. The invention further relates to a backlight unit having the light diffusing sheet incorporated therein.

BACKGROUND ART

A backlight unit of the general edge light type for liquid-crystal displays is constituted of a lightguide plate having dots for light diffusion printed on the back side thereof, a light source (e.g., a cold cathode fluorescent tube or LEDs) disposed on one or each side of the lightguide plate, a light diffusing film superposed on the lightguide plate, a lens film (prism film) superposed on the light diffusing sheet, etc.

One role of the light diffusing film in the backlight unit is to diffuse the light which has passed through the lightguide plate and thereby prevent the dots on the back side of the lightguide plate and bright lines of the light source from being visually recognized on the screen of the liquid-crystal display. Another roll of the light diffusing film is to lead the light which has passed through the lightguide plate and has a large brightness peak angle (the angle at which luminance has a peak; it means an angle with the front direction) to the lens film while converting it into diffused light having a smaller brightness peak angle than that in order that the diffused light might be brought to the front direction (the direction perpendicular to the screen of the liquid-crystal display) by the lens film to further heighten luminance.

Known as a light diffusing film which plays such roles is a film (sheet) in which projections of a rectangular pyramid shape having a vertex inclined to either of the left and right have been arranged lengthwise/crosswise on the light emission side (patent document 1). This light diffusing film (sheet) has a constitution in which each projection of a rectangular pyramid shape has a difference in bevel between the left-side and right-side inclined faces, and is intended to thereby lead the light which has passed through the lightguide plate and has a large brightness peak angle to the lens film while converting it into diffused light having a smaller brightness peak angle than that.

However, this light diffusing film (sheet) having projections of a rectangular pyramid shape is difficult to continuously produce by forming a film by melt extrusion and embossing the film with an embossing roll or the like. Practically, products of this light diffusing film must be produced one by one by injection molding, hot-press molding, or the like. There have hence been problems that the light diffusing film has poor productivity and an increased cost and that it is not easy to produce thin films having a thickness of 150 μm or smaller. In addition, the formation of projections of a rectangular pyramid shape regularly arranged lengthwise/crosswise as in this light diffusing film (sheet) has had problems that marring is apt to occur because of the projections and this is causative of defects and that the projections may cause a moiré or interference fringe, resulting in luminance unevenness.

Patent Document 1: Japanese Patent No. 2948796

DISCLOSURE OF THE INVENTION

Problems to be Solved by the Invention

The invention has been achieved in order to overcome the problems described above. An object to be accomplished by the invention is to provide a light diffusing sheet which enables the light from a lightguide plate or light source to be emitted after having been converted to diffused light having a small brightness peak angle in order to heighten the luminance of the screen of a liquid-crystal display, a screen for advertising signboards, illumination, or image displaying, or an apparatus such as a scanner or copier, and which generates neither a moiré or interference fringe nor luminance unevenness, enables images to be clearly displayed, and is advantageous also from the standpoints of productivity and cost. Another object is to provide a backlight unit having this light diffusing sheet incorporated therein.

Means for Solving the Problems

In order to accomplish those objects, the first light diffusing sheet of the invention comprises a light-transmitting resin and is characterized by having fine recesses formed in at least one of the surfaces thereof, the fine recesses having a shape which is any of the shape of an inverted polyangular pyramid, the shape of an inverted truncated polyangular pyramid, the shape of an inverted cone, and the shape of an inverted truncated cone.

The second light diffusing sheet of the invention comprises a core layer made of a light-transmitting resin and a surface layer laminated to at least one of the surfaces of the core layer and made of a light-transmitting resin or of a light-transmitting resin containing a light diffusing agent, and is characterized in that the surface layer has, formed in the surface thereof, fine recesses having a shape which is any of the shape of an inverted polyangular pyramid, the shape of an inverted truncated polyangular pyramid, the shape of an inverted cone, and the shape of an inverted truncated cone.

The term "light diffusing sheet" as used herein means any of light diffusing members ranging from a light diffusing film having a thickness of about 50 μm to a light diffusing plate having a thickness of about 5 mm.

In the light diffusing sheet of the invention, it is desirable that the recesses should have been regularly arranged. It is also desirable to incorporate a light diffusing agent into the light diffusing sheet or to incorporate a light diffusing agent into the core layer of the light diffusing sheet. Furthermore, it is desirable that the bevel between the surface having fine recesses formed and each inclined face of each fine recess having the shape of an inverted polyangular pyramid or inverted truncated polyangular pyramid or the bevel between that surface and the ridgeline of each fine recess having the shape of an inverted cone or inverted truncated cone should be 15-70°. In particular, that bevel desirably is 35-70° for heightening luminance. Moreover, the proportion of the area occupied by the fine recesses in the surface having the fine recesses formed therein is desirably 30-100%. It is desirable that the fine recesses should have been formed in an oblique-line arrangement. In the light diffusing sheet of the invention, the surface on the side opposite to the surface having fine recesses formed may have recesses and protrusions which are finer than the fine recesses. A functional layer having light-transmitting properties, such as an ultraviolet-absorbing layer or an antistatic layer, may be formed in the light diffusing sheet.

On the other hand, the first backlight unit of the invention is characterized by including either of the light diffusing sheet described above which has a thickness of 50-300 μm and has been disposed on the front side of a lightguide plate so that that surface of the sheet which has fine recesses formed therein serves as a light emission side.

The second backlight unit of the invention is characterized by including either of the light diffusing sheet described above which has a thickness of 0.3-5 mm and has been disposed in front of a light source so that that surface of the sheet which has fine recesses formed therein serves as a light emission side.

Advantages of the Invention

A light diffusing sheet in which fine recesses having a shape which is any of the shape of an inverted polyangular pyramid, the shape of an inverted truncated polyangular pyramid, the shape of an inverted cone, and the shape of an inverted truncated cone have been formed in at least one of the surfaces thereof as in the first light diffusing sheet of the invention is free from the trouble that the surface having fine recesses mars a film, etc., because in this light diffusing sheet, the vertex parts of the recesses in the surface are connected in all directions and are flat. These fine recesses can be easily formed by embossing. This light diffusing sheet can hence be continuously and efficiently produced by subjecting a sheet formed by melt extrusion to embossing with an embossing roll or the like. In particular, in the case of forming recesses regularly arranged, embossing with a roll is easy and these recesses can be easily formed. Consequently, the first light diffusing sheet of the invention is less apt to mar a lens film, etc., and attains high productivity and a cost reduction as compared with the light diffusing film (sheet) disclosed in patent document 1, which is produced one by one by injection molding or the like. In addition, the light diffusing sheet can be easily produced in a small thickness.

When the first light diffusing sheet of the invention is disposed so that the surface thereof which has fine recesses formed therein serves as a light emission side, then the light which has entered after having passed through the lightguide plate or having been emitted by the light source is converted to diffused light having a small brightness peak angle due to the light-refracting function of the inclined faces of the fine recesses having the shape of an inverted polyangular pyramid or inverted truncated polyangular pyramid or the light-refracting function of the tapered surfaces of the fine recesses having the shape of an inverted cone or inverted truncated cone, before being emitted and led to the lens film. Consequently, by bringing this diffused light having a small brightness peak angle to the front direction (the direction perpendicular to the screen of the liquid-crystal display) by the lens film, the luminance of the screen of the liquid-crystal display can be sufficiently heightened. In addition, since light is intensely diffused by the fine recesses, the dots on the lightguide plate and the bright lines attributable to the light source become less apt to be visually recognized. Namely, hiding properties are improved and the generation of a moiré or interference fringe is inhibited. In this case, when the light diffusing sheet contains a light diffusing agent, light is diffused more intensely to increase the haze. Because of this, the hiding properties are improved further and the effect of inhibiting the generation of a moiré or interference fringe is also improved.

The function of reducing the brightness peak angle of the diffused light emitted from the light diffusing sheet is remarkable when the bevel between the surface having fine recesses formed (light emission side) and each inclined face of each fine recess having the shape of an inverted polyangular pyramid or inverted truncated polyangular pyramid or the bevel between that surface and the ridgeline of each fine recess having the shape of an inverted cone or inverted truncated cone is 15-70° and when the proportion of the area occupied by the fine recesses in the surface having the fine recesses formed therein (light emission side) is 30-100%. Furthermore, when that bevel in the fine recesses is 35-70° and the areal proportion of the fine recesses is 30-100%, then the light which remained unemitted due to the total reflection of part of incident light and has been returned by a light reflection sheet or the like and entered the light diffusing film again can be efficiently emitted. Because of this, luminance can be improved without reducing haze.

Furthermore, the light diffusing sheet in which the fine recesses have been formed in an oblique-line arrangement is effective in making a moiré or interference fringe less visible and does not cause luminance unevenness.

The second light diffusing sheet of the invention comprises a core layer and, laminated to at least one of the surfaces thereof, a surface layer made of a light-transmitting resin or of a light-transmitting resin containing a light diffusing agent, and this surface layer has the fine recesses formed in the surface thereof. By disposing this light diffusing sheet so that that surface of the surface layer which has the fine recesses formed therein serves as a light emission side, the same effects as described above can be obtained.

In the case where the surface layers of the second light diffusing sheet are made of a light-transmitting resin containing no light diffusing agent, the following effect is brought about. Even when the core layer of this sheet contains a light diffusing agent, formation of this sheet by melt extrusion molding (three-layer coextrusion molding) does not result in the so-called eye mucus phenomenon in which the light diffusing agent adheres to the periphery of the extrusion orifice, because the core layer is covered by the light-transmitting resin constituting the surface layers. Consequently, the sheet surfaces can be prevented from bearing streak lines. On the other hand, in the case where the surface layers contain a light diffusing agent, not only light diffusing properties are improved, but also the surface layers can have a reduced coefficient of linear expansion. Consequently, this light diffusing sheet can be prevented from rumpling, especially after the sheet is incorporated in a backlight unit and illuminated.

In the first and second light diffusing sheet of the invention in which the surface thereof on the side opposite to the surface having fine recesses formed has recesses and protrusions which are finer than the fine recesses, light diffusion is further enhanced by these microfine recesses and protrusions and this further improves hiding properties. Furthermore, those in which a functional layer having light-transmitting properties, such as an ultraviolet-absorbing layer or an antistatic layer, has been laminated to the surface on the side opposite to the surface having fine recesses formed have an advantage that the function of the functional layer, such as, e.g., the prevention of deterioration by ultraviolet or the prevention of dust particle adhesion, is exhibited.

In the first backlight unit of the invention, the light which has passed through the lightguide plate and entered the light diffusing sheet of the invention having a thickness of 50-300 μm and which has a large brightness peak angle is brought to a direction where the brightness peak angle becomes small by the emission-side fine recesses having a shape which is any of the shape of an inverted polyangular pyramid, the shape of an inverted truncated polyangular pyramid, the shape of an inverted cone, and the shape of an inverted truncated cone. As a result, the light is emitted as diffused light having a small brightness peak angle. When a lens film has been disposed in front, the diffused light having a small brightness peak angle is led to the lens film and brought to the front direction by the lens film.

In the second backlight unit of the invention, the light which has been emitted by the light source and entered the light diffusing sheet of the invention having a thickness of 0.3-5 mm and which has a large brightness peak angle is likewise emitted after having been converted to diffused light having a small brightness peak angle by the emission-side fine recesses. When a lens film has been disposed in front, the diffused light is led to the lens film and brought to the front direction by the lens film.

Consequently, by incorporating these backlight units so as to be disposed on the back side of, e.g., the screen of a liquid-crystal display, not only the luminance of the display screen is sufficiently heightened but also the dots on the back side of the lightguide plate and bright lines attributable to the light source are prevented from being visually recognized.

DESCRIPTION OF REFERENCE NUMERALS AND SIGNS

Figure 1:
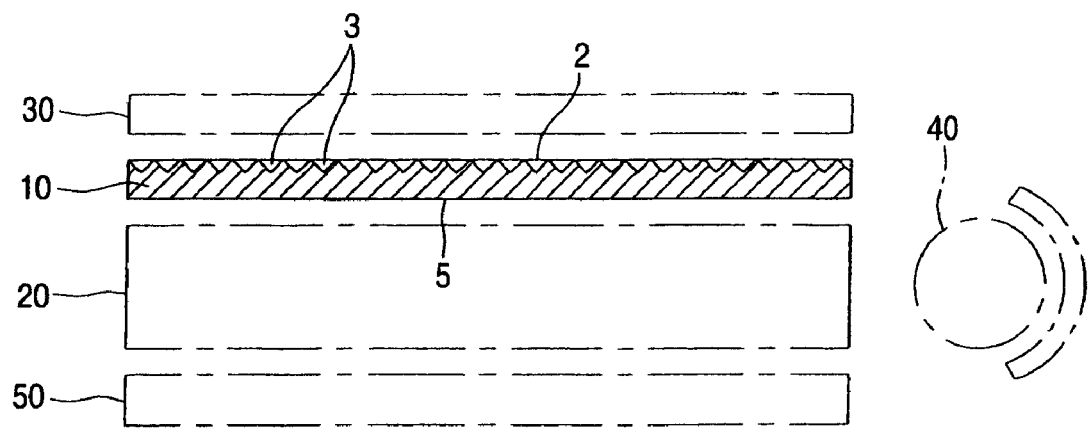
FIG. 1 is a diagrammatic sectional view of a light diffusing sheet (Example 1) according to one embodiment of the invention, and shows the light diffusing sheet incorporated in a backlight unit of the edge light type indicated by the imaginary lines.

10, 11, 12, 13, 14 light diffusing sheet
2 one upper surface (light emission side)
3 fine recess
4 inclined face of fine recess
5 another lower surface (light entrance side)
6, 8 surface layer
7 microfine recesses and protrusions
9 functional layer
20 lightguide plate
30 lens film
40 light source (cold cathode fluorescent tube)
θ bevel of inclined face of fine recess
d depth of deepest part of fine recess
t thickness of light diffusing sheet

BEST MODE FOR CARRYING OUT THE INVENTION

Specific embodiments of the light diffusing sheet according to the invention will be described below in detail by reference to the drawings, but the invention should not be construed as being limited to these embodiments only.

EXAMPLE 1

Figure 2:
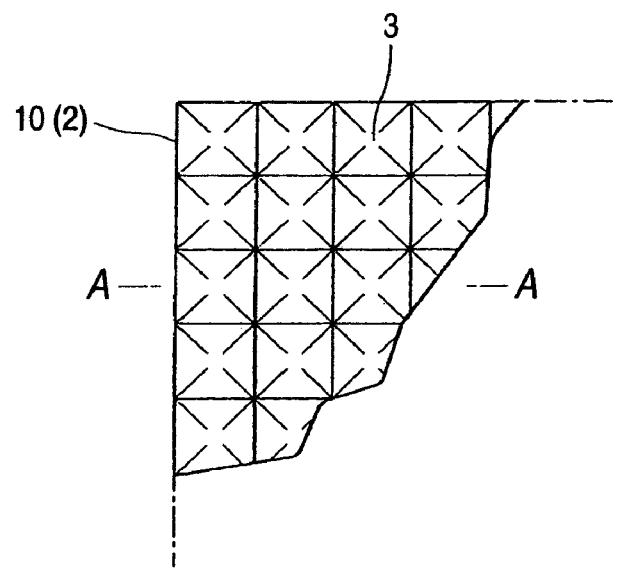
FIG. 2 is an enlarged plan view illustrating part of the light diffusing sheet.
Figure 3:
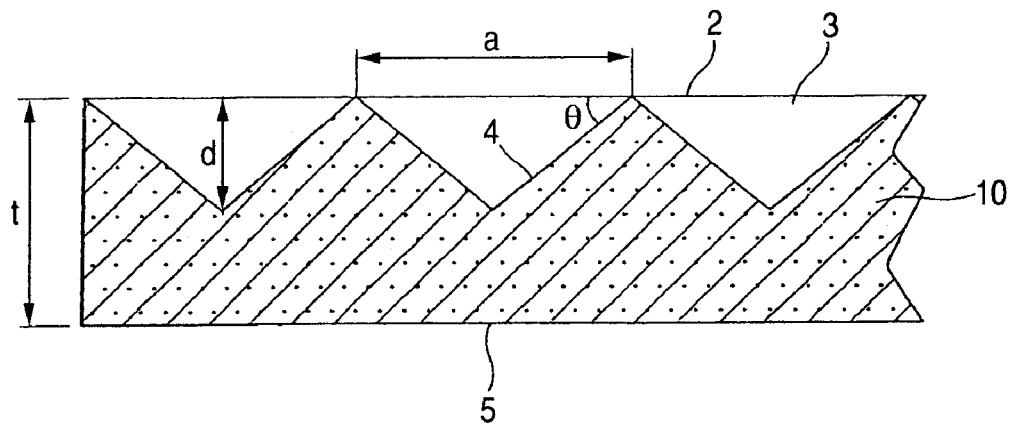
FIG. 3 is an enlarged sectional view illustrating part of the light diffusing sheet.

FIG. 1 is a diagrammatic sectional view of a light diffusing sheet according to one embodiment of the invention, and shows the light diffusing sheet incorporated in a backlight unit of the edge light type indicated by the imaginary lines. FIG. 2 and FIG. 3 are an enlarged plan view and an enlarged sectional view each illustrating part of the light diffusing sheet.

This light diffusing sheet 10 comprises a light-transmitting resin sheet which contains a light diffusing agent and in which fine recesses 3 having the shape of an inverted regular quadrangular pyramid have been formed in order in one upper surface 2 serving as a light emission side. As shown in FIG. 1, this light diffusing sheet 10 is intended to be incorporated into a backlight unit of the edge light type so that the light diffusing sheet 10 is disposed between a lightguide plate 20 and a lens film (prism film) 30 disposed over (in front of) the lightguide plate 20. In FIG. 1, numeral 40 denotes a light source (cold cathode fluorescent tube) disposed along one side edge of the lightguide plate 20, and 50 denotes a light reflection sheet disposed under (at the back of) the lightguide plate 20. The light diffusing sheet 10 of the invention is useful especially as a light diffusing sheet for a backlight unit of the so-called edge light type in which light is emitted from the light source (cold cathode fluorescent tube) 40 disposed at an edge of the lightguide plate 20 as shown in FIG. 1, or as a light diffusing sheet for a backlight unit of the direct light type in which the light diffusing sheet is directly illuminated by light sources disposed below (on the back side) as will be described later.

Preferably used as the light-transmitting resin constituting the light diffusing sheet 10 is a thermoplastic resin having a high total light transmittance, such as a polycarbonate, polyester, polyethylene, polypropylene, polyolefin copolymer (e.g., poly(4-methylpentene-1)), poly(vinyl chloride), cyclic polyolefin (e.g., norbornene structure), acrylic resin, polystyrene, ionomer, or styrene/methyl methacrylate copolymer resin (MS resin). Incidentally, additives necessary for molding these resins, such as a stabilizer, lubricant, impact modifier, antioxidant, ultraviolet absorber, light stabilizer, and colorant, are suitably added.

Preferred of those resins are polycarbonates, polyesters (in particular, poly(ethylene terephthalate)), and cyclic polyolefins. This is because these resins have satisfactory heat resistance and are less apt to be deformed, rumpled, or otherwise adversely influenced by the heat generated by, e.g., the cold cathode fluorescent tube after incorporation into a backlight unit. In particular, polycarbonates are exceedingly preferred because they have satisfactory transparency and reduced hygroscopicity and give a light diffusing sheet which attains high luminance and is reduced in warpage.

Polypropylene is preferred because it has the following and other advantages. This polymer has satisfactory crystallinity and transparency. As the degree of crystallinity thereof is increased, the modulus of elasticity improves. As a result, not only this polymer is less apt to thermally deform or rumple, but also the refractive index thereof increases. The increased refractive index results in a reduced difference in refractive index between the polymer and the light diffusing agent, and this increases the amount of light passing through the light diffusing sheet to heighten the luminance. In particular, polypropylene having a degree of crystallinity of 30-80% not only has high rigidity but has a refractive index of about 1.48-1.52, which is close to the refractive index (1.54) of a talc powder, which is advantageously used as a light diffusing agent. Because of this, even when a talc powder is incorporated, this polypropylene can give a light diffusing sheet which has a high total light transmittance and high luminance. The degree of crystallinity of polypropylene is more preferably 50-60%.

The light diffusing agent serves to diffuse the light which has entered the light diffusing sheet and thereby improve dot-hiding properties and the like. In the case where the light-transmitting resin used for the light diffusing sheet has poor heat resistance or high thermal expansibility, the light diffusing agent serves to inhibit the thermal expansion and thereby prevent rumpling. It is therefore preferred that in the case where the light-transmitting resin has low heat resistance and high thermal expansibility like polypropylene, a light diffusing agent should be incorporated to improve these properties especially when the light diffusing sheet is as thin as 50-300 μm. On the other hand, in the case where the light-transmitting resin has satisfactory heat resistance and low thermal expansibility and does not arouse the trouble of rumpling of the light diffusing sheet, like polycarbonates, polyesters (in particular, poly(ethylene terephthalate)), and cyclic polyolefins, there is no particular need of incorporating a light diffusing agent especially when the light diffusing sheet has a thickness as large as 0.3-5 mm. However, when it is necessary to improve the light diffusing functional to improve hiding properties or when the light diffusing sheet is thin, then it is preferred to add a light diffusing agent.

As described above, the light diffusing agent to be incorporated in the light diffusing sheet 10 mainly serves to diffuse light and thereby improve dot-hiding properties or the like, and further serves to inhibit the thermal expansion of the light diffusing sheet 10 and thereby prevent rumpling. As the light diffusing agent may be used any one of or a combination of two or more of particulate materials differing in refractive index from the light-transmitting resin constituting the light diffusing sheet 10, such as particulate inorganic materials, particulate metal oxides, and particulate organic polymers. As the particulate inorganic materials, use may be made of particles of glasses [A-glass (soda-lime glass), C-glass (borosilicate glass), and E-glass (low-alkali glass)], silica, mica, synthetic mica, calcium carbonate, magnesium carbonate, barium sulfate, talc, montmorillonite, kaolin clay, bentonite, hectorite, silicones, and the like. As the particulate metal oxides may be used particles of titanium oxide, zinc oxide, alumina, and the like. As the particulate organic polymers may be used acrylic beads, styrene beads, particles of benzoguanamine, and the like. These light diffusing agents may have any shape, e.g., a spherical, platy, or fibrous shape.

Of the light diffusing agents shown above, the particulate inorganic materials having a low coefficient of linear expansion are preferably used from the standpoint of inhibiting the thermal expansion of the light diffusing sheet 10. In particular, talc particles are optimal for the following reasons. Talc particles have an aspect ratio as large as 3-500 and reduce the coefficient of linear expansion of the light diffusing sheet 10. In addition, talc particles function as a nucleating agent for polypropylene and can thereby form evenly dispersed fine polypropylene crystallites while heightening the degree of crystallinity of the polypropylene. Thus, talc particles can heighten the modulus of elasticity and other mechanical strength of the light diffusing sheet 10 comprising polypropylene. On the other hand, glass particles are preferred for obtaining a light diffusing sheet having a high luminance because glass particles themselves are transparent and well transmit light.

Of the light diffusing agents shown above, the particles of organic polymers which have excellent light-transmitting properties are preferred from the standpoint of heightening the light transmittance and luminance of the light diffusing sheet. In particular, acrylic beads and silicones are especially preferred because these materials have excellent light-transmitting properties as compared with the other organic polymers and are easily available. Light diffusing agents comprising these organic polymers are not so effective in inhibiting the thermal expansion of the light-transmitting resin. It is therefore preferred that such a light diffusing agent be incorporated in a resin having satisfactory heat resistance and low thermal expansibility, such as a polycarbonate.

The light diffusing agent to be used has an average particle diameter of 0.1-100 μm, preferably 0.5-50 μm, more preferably 1-30 μm. In case where the particle diameter of a light diffusing agent is smaller than 0.1 μm this light diffusing agent has poor dispersibility because it is apt to aggregate. Even when this light diffusing agent can be evenly dispersed, it has an impaired efficiency of light scattering because the wavelength of the light is longer than diameter of agent. Consequently, particles having a size of 0.5 μm or larger, especially 1 μm or larger, are preferred. On the other hand, in case where a light diffusing agent having a particle diameter larger than 100 μm is used, this results not only in uneven light scattering but in a reduced light transmittance and a trouble that particles are visually recognized. Consequently, particles of 50 μm or smaller, especially 30 μm or smaller, are preferred.

The content of the light diffusing agent is not particularly limited. However, it is preferably 35% by mass or lower. In case where the content thereof is higher than 35% by mass, the light transmittance and luminance of the light diffusing sheet decrease due to the light scattering, reflection, and absorption caused by the light diffusing agent. Because of this, even when a backlight unit having such a light diffusing sheet incorporated therein is used to illuminate a display from the back side, images on the display screen are difficult to recognize. In the case where the light diffusing agent is inorganic particles and it is necessary to inhibit thermal expansion, the content of the agent is preferably 15-35% by mass, especially preferably 18-30% by mass. In the case where the light diffusing agent is an organic polymer and the resin is one having satisfactory heat resistance and low thermal expansibility, it is preferred to incorporate the light diffusing agent in an amount of 1-10% by mass.

The thickness t of the light diffusing sheet 10 is not particularly limited. However, in the case where the light diffusing sheet 10 is to be incorporated into a backlight unit of the edge light type shown in FIG. 1, the thickness thereof is preferably about 50-300 μm. In case where the light diffusing sheet is thinner than 50 μm, this light diffusing sheet has a reduced modulus of elasticity and is apt to rumple. This light diffusing sheet further shows reduced light diffusion and hence has insufficient dot-hiding properties. In addition, in this light diffusing sheet, the fine recesses 3 formed in the upper surface 2 serving as a light emission side are inevitably too fine and, hence, the function of reducing the brightness peak angle of the diffused light emitted from the upper surface (light emission side) 2 becomes insufficient. On the other hand, in case where the light diffusing sheet is thicker than 300 μm, this tends to result in a reduced light transmittance and reduced luminance. There is hence a possibility that images on the display might be difficult to recognize. The thickness of the light diffusing sheet 10 is more preferably 80-200 μm, even more preferably 100-150 μm.

In contrast, in the case where the light diffusing sheet 10 is to be incorporated into a backlight unit of the direct light type which will be described later, the thickness t thereof is preferably about 0.3-5 mm because the light diffusing sheet 10 itself is required to have mechanical strength and rigidity.

A major feature of this light diffusing sheet 10 resides in that fine recesses 3 having the shape of an inverted regular quadrangular pyramid, which is a kind of inverted polyangular pyramid, have been formed in a lengthwise/crosswise arrangement in one upper surface 2 serving as a light emission side. These fine recesses 3 serve to reduce the brightness peak angle of the diffused light emitted from the upper surface (light emission side) 2 of the light diffusing sheet 10. The light diffusing sheet 10 thus enables the diffused light to be easily brought to the front direction (the direction perpendicular to the screen of the liquid-crystal display) by the lens film 30 and thereby heightens the luminance of the liquid-crystal display screen or the like.

Although these recesses may have been formed in a regular arrangement as shown in FIG. 2, they may have been formed irregularly and randomly. Regardless of whether the recesses have been formed in a regular arrangement or irregularly, the vertex parts of the four sides of each of all these recesses are located on the same plane on the upper surface. Namely, no sharp point is present on the upper surface. There is hence no possibility that the light diffusing sheet 10 might mar the lens film or another member to be disposed on (on the front side of) the sheet 10. It is, however, preferred that the recesses should be arranged regularly, because a processing for imparting embossing projections to the roll for forming such regularly arranged recesses is easier than in the case of forming irregularly arranged recesses.

The shape of the fine recesses 3 is not limited to the shape of an inverted regular quadrangular pyramid as in this embodiment. It is, however, necessary that the shape thereof should be any of the shape of an inverted polyangular pyramid, the shape of an inverted truncated polyangular pyramid, the shape of an inverted cone, and the shape of an inverted truncated cone. The shape of an inverted truncated polyangular pyramid means the shape formed by horizontally cutting off a top part, i.e., a lower part, from an inverted polyangular pyramid; while the shape of an inverted truncated cone means the shape formed by horizontally cutting off a top part, i.e., a lower part, from an inverted cone. It should, however, be noted that the surface formed by truncating may be a concave surface. Consequently, in the case of, e.g., recesses having the shape of an inverted truncated cone, examples thereof include recesses which as a whole are nearly semispherical.

Fine recesses of the shape of an inverted polyangular pyramid and fine recesses of the shape of an inverted cone are preferred because the inclined faces or tapered surfaces of these recesses can be made to have a large area and hence have the enhanced function of refracting light to thereby reduce the brightness peak angle. In particular, fine recesses 3 having the shape of an inverted regular quadrangular pyramid as in this embodiment are exceedingly preferred because they have the following advantages: such fine recesses 3 can be continuously formed either in the lengthwise/crosswise directions or in an oblique-line arrangement as will be described later and, hence, the proportion of the area occupied by the fine recesses 3 in the upper surface 2 having the recesses 3 formed therein can be increased to 100% at the most; and these fine recesses 3 are remarkably effective in reducing the brightness peak angle of the diffused light emitted from the upper surface (light emission side) 2. Furthermore, fine recesses 3 having the shape of an inverted truncated quadrangular pyramid (in other words, fine recesses 3 having the shape of an inverted quadrangular prismoid) such as those shown in FIG. 4 and fine recesses having the shape of an inverted truncated cone are preferred because of an advantage that such fine recesses can be extremely easily formed by embossing. In the case where the fine recesses 3 have the shape of an inverted polyangular pyramid or inverted cone, it is preferred from the standpoint of production that the deepest parts of the recesses be rounded appropriately.

The bevel θ between the upper surface 2 having the fine recesses 3 formed therein in order and each inclined face 4 of each fine recess 3 having an inverted regular quadrangular pyramid shape is preferably 15-70°. As long as that bevel is within this range, the brightness peak angle of the diffused light emitted from the upper surface 2 serving as a light emission side can be reduced to about 25-45° by the light-refracting function of the inclined faces 4. The bevel θ of the inclined faces 4 of the fine recesses 3 is more preferably 20-55°. In particular, the light diffusing sheet 10 in which fine recesses 3 having the shape of an inverted regular quadrangular pyramid with inclined faces 4 having a bevel of 25° or 45° have been formed in the upper surface 2 (light emission side) exhibits the satisfactory effect of reducing the brightness peak angle as supported by the experimental results which will be given later.

For the same reason, also in the case of fine recesses having the shape of an inverted polyangular pyramid other than inverted regular quadrangular pyramids or the shape of an inverted truncated polyangular pyramid or in the case of fine recesses having the shape of an inverted cone or inverted truncated cone, the bevel of the inclined faces of the former recesses or the bevel of the ridgelines of the latter recesses is regulated preferably to 15-70°, more preferably 20-55°.

For obtaining a light diffusing sheet having a high luminance, it is desirable that the bevel θ for the fine recesses should be 35-70°. As long as the bevel is regulated so as to be within this range, the light which remained unemitted due to the total reflection of part of incident light and has been returned by a light reflection sheet or the like and entered the light diffusing film again can be efficiently emitted. Because of this, luminance can be improved without reducing haze, as supported by the experimental results which will be given later.

Consequently, for obtaining a light diffusing sheet which reduces the brightness peak angle and has a high luminance, it is highly preferred that the bevel θ should be regulated to 35-55°.

Figure 8:
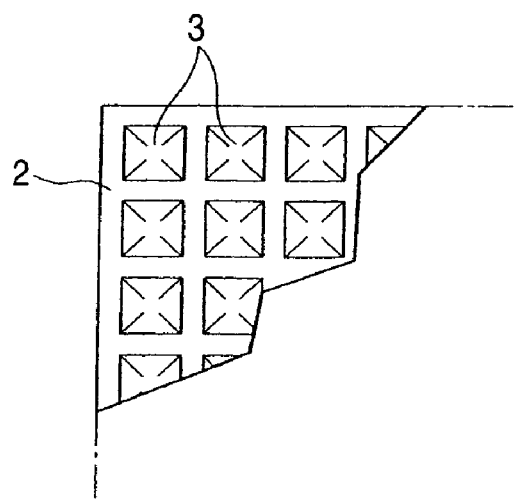
FIG. 8 is a plan view illustrating another example of that surface of a light diffusing sheet in which recesses have been formed in order.

In this embodiment of the light diffusing sheet 10, fine recesses 3 having the shape of an inverted regular quadrangular pyramid have been continuously formed in a lengthwise/crosswise arrangement as shown in FIG. 2, whereby the proportion of the area occupied by the recesses 3 in the upper surface 2 having the recesses 3 formed therein has been regulated to 100%. However, fine recesses 3 may be formed in an upper surface 2 in a lengthwise/crosswise arrangement so as to be spaced from one another as shown in, e.g., FIG. 8 to thereby regulate the proportion of the area occupied by these recesses 3 to a value of 30% or higher and lower than 100%. In case where the proportion of the fine recesses 3 is smaller than 30%, the proportion of the flat surface, which makes substantially no contribution to the reduction of brightness peak angle, is too large and the function of reducing the brightness peak angle decreases. Especially when the proportion of the area occupied by the fine recesses is 90-100% and the bevel of the inclined faces of the fine recesses 3 is 20-55° as stated above, the function of reducing the brightness peak angle is remarkable. When the bevel is 35-70°, the function of heightening luminance without reducing haze is remarkable. In the case where the proportion of the area occupied by the fine recesses 3 is smaller than 100%, it is preferred to finely roughen the flat surface (upon surface between the recesses), which is the surface not occupied by the recesses, to cause the finely roughened surface to scatter light.

In the case where the light diffusing sheet 10 has a thickness t of 50-300 μm, the depth d of the deepest parts of the fine recesses 3 is preferably from 3/10 to 9/10 the thickness t. When the deepest parts have such a depth, the light diffusing sheet 10 does not have a considerably reduced tear strength and the fine recesses 3 have a moderate size (fineness). This light diffusing sheet 10 hence has the sufficient function of reducing the brightness peak angle.

In this embodiment, the length a of each side of each fine recess 3 having the shape of an inverted regular quadrangular pyramid varies depending on the depth d of the deepest part of the recess 3 and the bevel θ. However, the side length a is preferably about 50-600 μm from the standpoint of the function of reducing the brightness peak angle. The length a is more preferably 100-500 μm. In case where the length a of each side is shorter than 50 μm, the recesses 3 are so fine that the function of randomly diffusing light becomes stronger than the function of reducing the brightness peak angle. Conversely, in case where the length a is longer than 600 μm, the recesses 3 are so rough that it is difficult to stably impart the bevel θ to the upper surface of the film. In the case of recesses 3 having another inverted pyramid shape, i.e., the shape of an inverted polyangular pyramid other than inverted regular quadrangular pyramids or having the shape of an inverted truncated polyangular pyramid, the length a of each side of the recesses 3 has been regulated to 50-600 μm as in the embodiment described above. In the case of the shape of an inverted cone or inverted truncated cone, the diameter of each recess has been regulated to 50-600 μm. In either case, the length a or the diameter is more preferably 100-500 μm. It is preferred that even when the light diffusing sheet 10 has a large thickness, the length or diameter should be the same as stated above.

Figure 9:
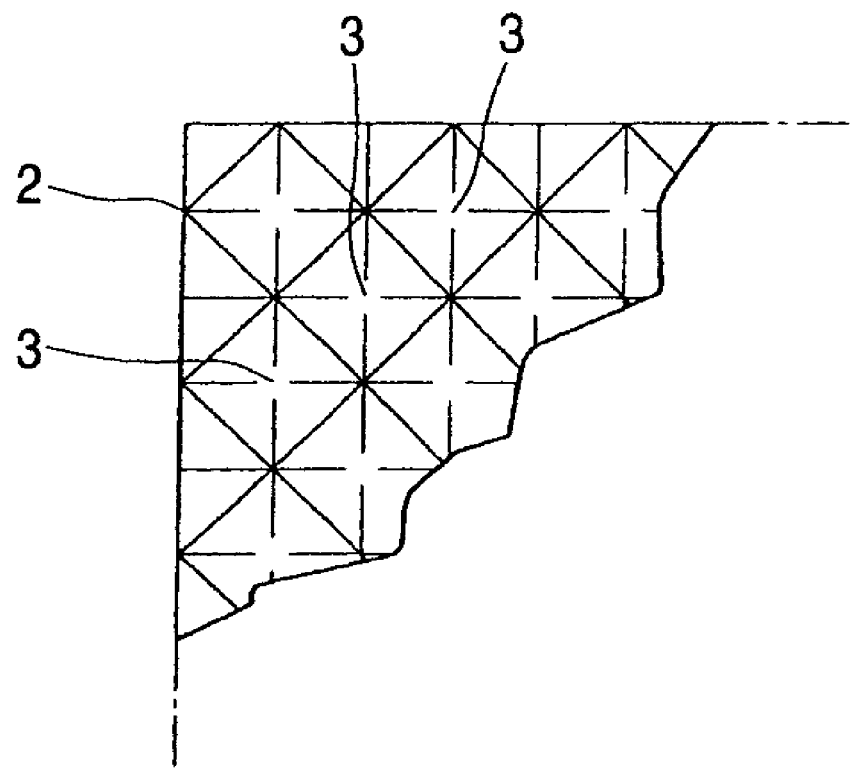
FIG. 9 is a plan view illustrating still another example of that surface of a light diffusing sheet in which recesses have been formed in order.

The fine recesses 3 having an inverted polyangular shape may be formed in a lengthwise/crosswise arrangement as in this embodiment, or may be formed in an oblique-line arrangement based on the lengthwise or crosswise direction for the light diffusing sheet as shown in FIG. 9. When the fine recesses 3 are formed in a lengthwise/crosswise arrangement, there are cases where a moiré or interference fringe generates. In contrast, when the fine recesses 3 have been formed in an oblique-line arrangement, such a moiré or interference fringe is less visible and luminance unevenness does not result.

In this embodiment of the light diffusing sheet 10, the lower surface 5 serving as a light entrance side is a flat surface. In some cases, however, recesses and protrusions (matte surface) which are finer than the fine recesses 3 and preferably have the arithmetic mean deviation of the profile of 10 μm or less may be formed on the lower surface 5. The formation of such microfine recesses and protrusions on the lower surface 5 has an advantage that these recesses and protrusions further enhance light diffusion to further improve dot-hiding properties. Furthermore, recesses which are the same as the fine recesses 5 having the shape of an inverted polyangular pyramid formed in the upper surface 2 may be formed in the lower surface 5.

The light diffusing sheet 10 of Example 1, which has the constitution described above, can be efficiently and continuously produced, for example, by the following method. First, either a light-transmitting resin or a light-transmitting resin containing the light diffusing agent described above is heated/melted and continuously extruded into a sheet form through the extrusion orifice of an extruder. Subsequently, this sheet formed by extrusion molding is continuously passed through the nip between an embossing roll (a roll having, formed in order on the surface thereof, fine projections which correspond and conform to the fine recesses 3) and a support roll to form the fine recesses 3 in a lengthwise/crosswise arrangement in one of the surfaces of the sheet with the embossing roll and thereby continuously form a light diffusing sheet 10. The light diffusing sheet 10 of Example 1 can be thus produced efficiently and continuously by forming fine recesses 3 with an embossing roll while conducting continuous extrusion molding. Consequently, this light diffusing sheet 10 has far higher productivity than the light diffusing sheets produced by the bead coating method heretofore in use or light diffusing sheets which must be produced one by one by injection molding, hot-press molding, or the like, such as the light diffusing sheet disclosed in patent document 1. A cost reduction can hence be attained, and a light diffusing sheet as thin as, e.g., 150 μm or thinner can also be easily produced.

This light diffusing sheet 10 of Example 1 is incorporated into a backlight unit of the edge light type so that it is disposed between the lightguide plate 20 and the lens film 30 and that the upper surface 2 having fine recesses 3 formed therein serves as a light emission side, as shown in FIG. 1. When this backlight unit is used, the light having a large brightness peak angle (usually, light having a brightness peak angle of 60° or larger) which was emitted by the light source (cold cathode fluorescent tube) 40 and has entered the light diffusing sheet 10 through the lightguide plate 20 is sufficiently diffused by the light diffusing agent contained in the light diffusing sheet 10. This diffused light is brought to a direction where the brightness peak angle becomes small by the light-refracting function of the inclined faces 4 of the fine recesses 3 having the shape of an inverted regular quadrangular pyramid. The diffused light is thus converted to diffused light having a small brightness peak angle (diffused light having a brightness peak angle of about 25-45°) and led to the lens film 30. Consequently, this diffused light having a small brightness peak angle is brought to the front direction (the direction perpendicular to the screen of the liquid-crystal display) by the lens film 30. The luminance of the liquid-crystal display screen or the like can hence be sufficiently heightened. In addition, when the light diffusing sheet 10 contains a light diffusing agent, dot-hiding properties are improved and the generation of a moiré or interference fringe is inhibited, because light is intensely diffused by the light diffusing agent.

EXAMPLE 2

Figure 4:
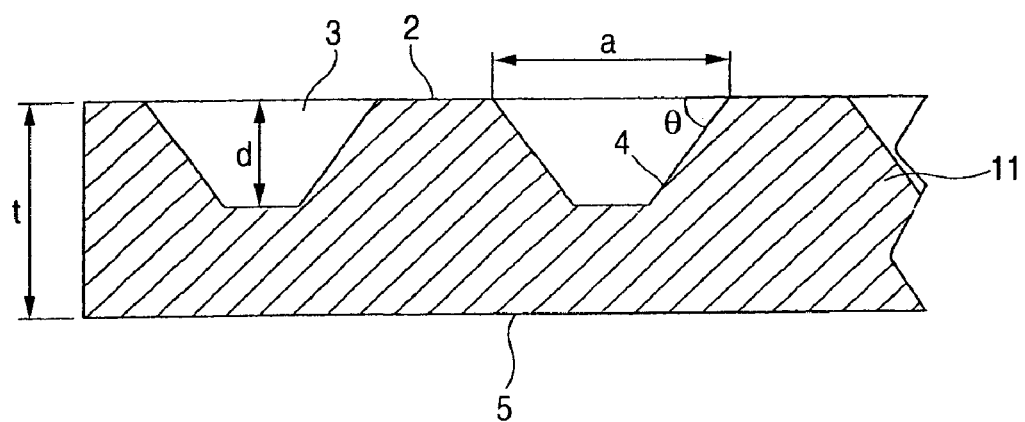
FIG. 4 is an enlarged sectional view illustrating part of a light diffusing sheet (Example 2) according to another embodiment of the invention.

FIG. 4 is an enlarged sectional view illustrating part of a light diffusing sheet according to another embodiment of the invention. This light diffusing sheet 11 comprises a light-transmitting resin sheet which contains no light diffusing agent and in which fine recesses 3 having the shape of an inverted truncated regular quadrangular pyramid have been formed apart from one another in a lengthwise/crosswise arrangement in the upper surface 2 serving as a light emission side.

The light-transmitting resin to be used in this embodiment can be any of the aforementioned light-transmitting resins having a high total light transmittance. However, it is especially preferred to select a resin which has high heat resistance even when no light diffusing agent is contained therein and which is free from troubles such as rumpling after incorporation in a backlight unit. Examples of such resins include polycarbonates, polyesters (in particular, biaxially stretched poly(ethylene terephthalate)), and cyclic polyolefins.

As stated above, the fine recesses 3 in this embodiment have the shape of an inverted truncated regular quadrangular pyramid, in other words, the shape of an inverted regular quadrangular prismoid, which is a kind of inverted truncated polyangular pyramid. Namely, the upper-end opening of each of these fine recesses 3 is a square and the bottom of the recess 3 also is a square, which is smaller than the upper-end opening. The fine recess 3 has the shape of an inverted regular quadrangular prismoid. The bevel θ of each inclined face 4 is 15-70° as in Example 1. Especially when the brightness peak angle is desired to be further reduced or when a higher luminance is desired, then the bevel θ is regulated to 20-55° or 35-70°, respectively. It is preferred that these fine recesses 3 should be formed apart from one another in a lengthwise/crosswise arrangement so that the a real proportion thereof to the upper surface 2 is at least 30%. In case where the a real proportion thereof is lower than 30%, not only the function of reducing the brightness peak angle decreases but also light diffusion becomes weak, resulting in an insufficient luminance and insufficient hiding properties.

The depth d of the deepest part of each fine recess 3 and the length a of each side thereof are the same as those in Example 1. The depth d is about from 3/10 to 9/10 the thickness of the light diffusing sheet 11. The length of the side a is about 50-600 µm, preferably about 100-500 µm. The thickness t of the light diffusing sheet 11 is 50-300 µm as in Example 1. However, in the case where the light diffusing sheet 11 is to be incorporated into a backlight unit of the direct light type, the thickness thereof is regulated to 0.3-5 mm as described above. These fine recesses 3 may be continuously formed in a lengthwise/crosswise arrangement or may be formed in an oblique-line arrangement continuously or apart from one another. Furthermore, the fine recesses 3 or recesses and protrusions which are finer than the recesses 3 may be formed on the lower surface 5, in which fine recesses 3 have not been formed and which serves as a light entrance side. Although recesses having the shape of an inverted truncated polyangular pyramid were formed in this embodiment, the recesses may have another shape, i.e., the shape of an inverted polyangular pyramid, the shape of an inverted cone, or the shape of an inverted truncated cone.

When the light diffusing sheet 11 of this embodiment is incorporated into a backlight unit of the edge light type so that the upper surface 2 having fine recesses 3 formed in order therein serves as a light emission side like the light diffusing sheet 10 described above and this backlight unit is used, then the following effect is brought about. The light having a large brightness peak angle which was emitted by the light source (cold cathode fluorescent tube) and has entered the light diffusing sheet 11 through the lightguide plate is brought to a direction where the brightness peak angle becomes small by the light-refracting function of the inclined faces 4 of the fine recesses 3 having the shape of an inverted truncated regular quadrangular pyramid (an inverted regular quadrangular prismoid). The diffused light is thus converted to diffused light having a small brightness peak angle and led to the lens film. The luminance of the screen of a liquid-crystal display or the like can hence be heightened. It is a matter of course that by increasing the thickness of this light diffusing sheet 11, it is made usable in a backlight unit of the direct light type.

EXAMPLE 3

Figure 5:
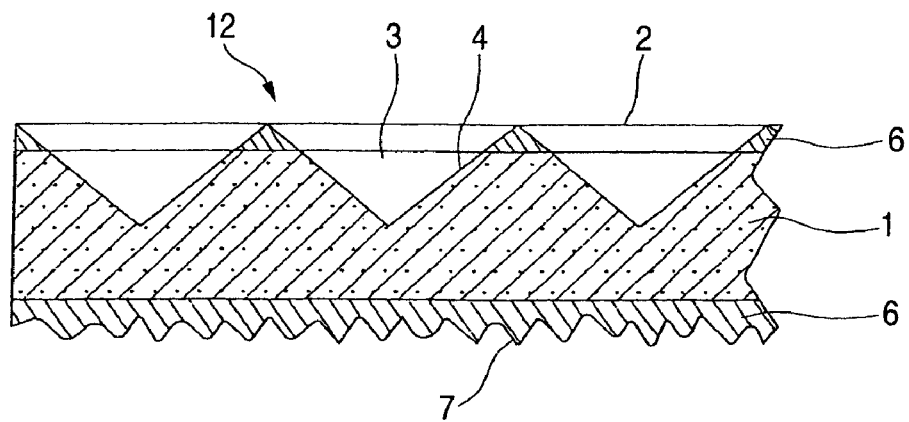
FIG. 5 is an enlarged sectional view illustrating part of a light diffusing sheet (Example 3) according to still another embodiment of the invention.

FIG. 5 is an enlarged sectional view illustrating part of a light diffusing sheet according to still another embodiment of the invention. This light diffusing sheet 12 comprises a core layer 1 (light diffusing sheet main body) made of a light-transmitting resin containing a light diffusing agent and surface layers 6 and 6 which are made of a light-transmitting resin and have been laminated respectively to both sides of the core layer 1. The upper surface layer 6 serving as a light emission side has fine recesses 3 having the shape of an inverted regular quadrangular pyramid described above continuously formed in a lengthwise/crosswise arrangement in the surface 2 of the layer 6. The lower surface layer 6 serving as a light entrance side has surface recesses and protrusions 7 which are finer than the fine recesses 3 and have the arithmetic mean deviation of the profile of 10 µm or lower.

Although the core layer 1 in this embodiment contains a light diffusing agent, the layer 1 need not contain the agent. Furthermore, in this embodiment, surface layers 6 and 6 have been formed respectively on the upper and lower sides of the core layer 1 and the upper surface layer 6 only has fine recesses 3 formed in the surface 2 thereof. However, fine recesses 3 may be likewise formed also in the surface of the lower surface layer 6. In some cases, a constitution may be employed in which a surface layer 6 is formed on only one of the upper and lower surfaces of the core layer 1 and fine recesses 3 are formed only in the surface of this surface layer 6. It is a matter of course that recesses and protrusions 7 which are finer than the fine recesses 3 may be formed on that surface of the surface layer 6 in which fine recesses have not been formed and on the surface of the core layer 1. These recesses and protrusions 7 may, of course, be omitted so that the surface remains flat. Furthermore, recesses having the shape of an inverted polyangular pyramid, inverted cone, or inverted truncated cone may be formed in place of the recesses having the shape of an inverted truncated polyangular pyramid.

The surface layers 6 and 6 are layers which are made of the same light-transmitting resin as the light-transmitting resin described above and contain no light diffusing agent. These layers are formed for the purpose of covering the light diffusing agent exposed on both sides of the core layer 1 made of a light-transmitting resin. Because of this, a thickness as small as about 5-20 µm suffices for the surface layers 6 and 6.

The fine recesses 3 and other constitutions of this light diffusing sheet 12 are the same as in the light diffusing sheet 10 described above. Explanations thereon are hence omitted.

The light diffusing sheet 12 of Example 3 described above can be efficiently and continuously produced, for example, by the following method. First, using a multilayer coextrusion molding machine, a molten-state light-transmitting resin containing the light diffusing agent described above and a molten-state light-transmitting resin containing no light diffusing agent are subjected to three-layer coextrusion molding so that the latter resin is superposed on the upper and lower sides of the former resin. Thus, a film having a three-layer structure is continuously formed, which is composed of a core layer 1 made of the light-transmitting resin containing the light diffusing agent and surface layers 6 and 6 containing no light diffusing agent and laminated respectively to both sides of the core layer 1. Subsequently, this sheet of a three-layer structure formed by extrusion molding is continuously passed through the nip between upper and lower embossing rolls (an upper roll having, formed in order on the surface thereof, fine projections corresponding and conforming to the fine recesses 3 and a lower roll having, formed on the surface thereof, microfine recesses and protrusions corresponding and conforming to the microfine recesses and protrusions 7). Thus, the fine recesses 3 in a lengthwise/crosswise arrangement and the microfine recesses and protrusions 7 are formed respectively on one side and the opposite side of the sheet with these embossing rolls to thereby continuously produce a light diffusing sheet 12. The light diffusing sheet 12 of Example 3 can be thus produced efficiently and continuously by forming fine recesses 3 and microfine recesses and protrusions 7 with upper and lower embossing rolls while conducting continuous extrusion molding. In addition, this operation for producing the sheet of a three-layer structure by three-layer coextrusion molding has an advantage that since the light diffusing agent contained in the interlayer light-transmitting resin is covered by the light-transmitting resin for forming the upper and lower surface layers, the molding operation is free from the so-called eye mucus phenomenon in which the light diffusing agent adheres to the periphery of the extrusion orifice of the extrusion molding machine and, hence, the sheet surfaces can be prevented from bearing streak lines.

This light diffusing sheet 12 of Example 3 is incorporated into a backlight unit of the edge light type so that it is disposed between the lightguide plate 20 and the lens film 30 and that the surface 2 of the upper surface layer 6 which has fine recesses 3 formed therein serves as a light emission side. When this backlight unit is used, the following effect is brought about besides the same effect as that obtained with the light diffusing sheet 10 described above. Namely, due to the microfine recesses and protrusions 7 formed on the surface of the lower surface layer 6 serving as a light entrance side, light diffusion is enhanced and the hiding properties are further improved. It is a matter of course that by increasing the thickness of this light diffusing sheet 12, it is made usable in a backlight unit of the direct light type.

EXAMPLE 4

Figure 6:
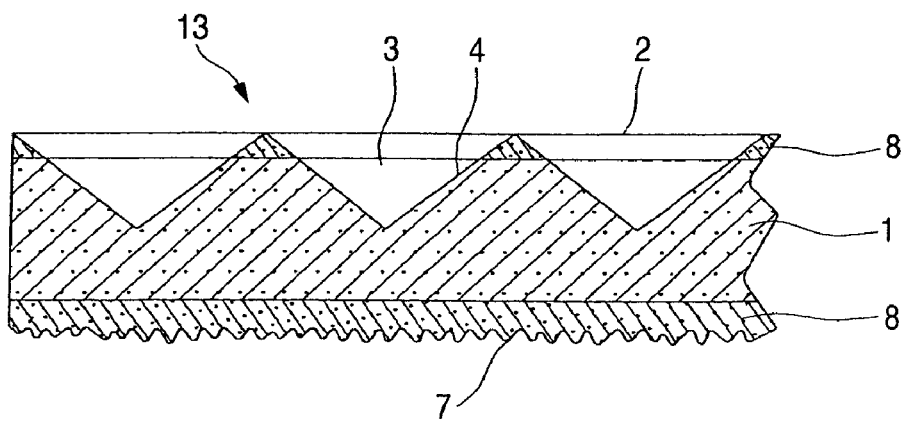
FIG. 6 is an enlarged sectional view illustrating part of a light diffusing sheet (Example 4) according to a further embodiment of the invention.

FIG. 6 is an enlarged sectional view illustrating part of a light diffusing sheet according to a further embodiment of the invention. This light diffusing sheet 13 comprises a core layer 1 (light diffusing sheet main body) made of a light-transmitting resin containing a light diffusing agent and surface layers 8 and 8 which are made of a light-transmitting resin containing alight diffusing agent and have been laminated respectively to both sides of the core layer 1. The upper surface layer 8 serving as a light emission side has the fine recesses 3 continuously formed in a lengthwise/crosswise arrangement in the surface 2 of the layer 8. The lower surface layer 8 serving as a light entrance side has surface recesses and protrusions 7 which are finer than the fine recesses 3 and have the arithmetic mean deviation of the profile of 10 μm or lower.

Although the core layer 1 in this embodiment contains a light diffusing agent, the layer 1 does not need to contain the agent. Furthermore, in this embodiment, surface layers 8 and 8 have been formed respectively on the upper and lower sides of the core layer 1 and the upper surface layer 8 only has fine recesses 3 formed in the surface 2 thereof. However, fine recesses 3 may be formed also in the surface of the lower surface layer 8. In some cases, a constitution may be employed in which a surface layer 8 is formed on only one of the upper and lower surfaces of the core layer 1 and fine recesses 3 are formed in the surface of this surface layer 8. Recesses and protrusions 7 which are finer than the fine recesses 3, such as those shown in FIG. 6, may be formed on that surface of the surface layer 8 in which fine recesses have not been formed and on the surface of the core layer 1. These recesses and protrusions 7 may be omitted. Furthermore, recesses having the shape of an inverted polyangular pyramid, inverted cone, or inverted truncated cone may be formed in place of the recesses having the shape of an inverted truncated polyangular pyramid.

The surface layers 8 and 8 are layers made of the light-transmitting resin described above which contains the light diffusing agent described above. Since the light diffusing agent contained in the surface layers 8 also serve to diffuse light, this light diffusing sheet 13 can have further improved light diffusing performance. In addition, the surface layers 8 have a reduced coefficient of linear expansion due to the light diffusing agent like the core layer 1 and, hence, the light diffusing sheet 13 can be prevented from rumpling. The amount of the light diffusing agent to be contained in these surface layers 8 is desirably regulated to 10-40% by mass. In the case where this light diffusing agent is the same as the light diffusing agent for the core layer 1, it is necessary that the light diffusing agent should be contained in different amounts. When different light diffusing agents are used, they may be contained in the same amount.

Preferred light diffusing agents to be contained in the surface layers 8 are the particulate organic polymers and particulate glasses shown above. The reasons for this are as follows. The particulate organic polymers have a smooth particle surface and do not mar the lens film even when protrude from the surface layer 8. In addition, the particulate organic polymers are less apt to cause the eye mucus phenomenon during extrusion molding. On the other hand, the particulate glasses have a high total light transmittance and, hence, the incorporation thereof reduces the coefficient of linear expansion without lowering the total light transmittance of the light diffusing sheet.

The fine recesses 3 and other constitutions of this light diffusing sheet 13 are the same as in the light diffusing sheet 10 described above. Explanations thereon are hence omitted.

The light diffusing sheet 13 of Example 4 described above also can be efficiently and continuously produced in the same manner as for the light diffusing sheet 12, except that a light-transmitting resin containing a light diffusing agent is used as the resin for forming the surface layers 8. Details thereof are hence omitted.

The light diffusing sheet 13 of Example 4 is incorporated into a backlight unit of the edge light type so that it is disposed between the lightguide plate 20 and the lens film 30. When this backlight unit is used, the following effects are brought about besides the same effects as those obtained with the light diffusing sheet 12 described above. Namely, the function of diffusing light is enhanced by the surface layers 8, and the light diffusing sheet 13 satisfactory diffuses light and has improved dot-hiding properties. In addition, since the surface layers 8 also have a reduced coefficient of linear expansion, the light diffusing sheet 13 does not rumple even upon exposure to the heat of, e.g., the light source in the backlight unit and can attain an even luminance. It is a matter of course that by increasing the thickness of this light diffusing sheet 13, it is made usable in a backlight unit of the direct light type.

Figure 7:
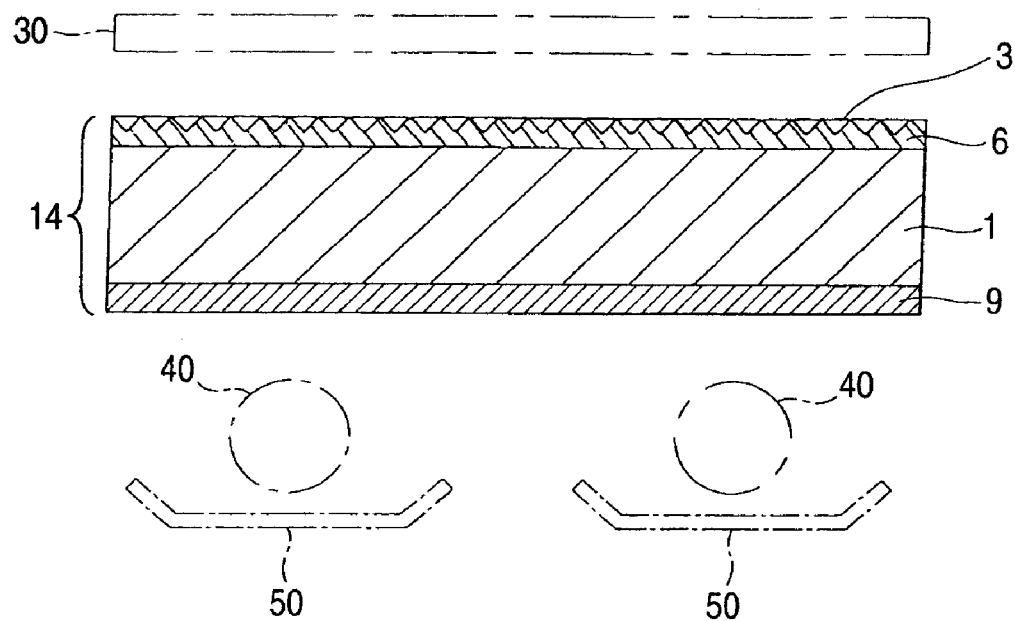
FIG. 7 is a diagrammatic sectional view of a light diffusing sheet (Example 5) according to still a further embodiment of the invention, and shows the light diffusing sheet incorporated in a backlight unit of the direct light type indicated by the imaginary lines.

FIG. 7 is a diagrammatic sectional view of a light diffusing sheet according to still a further embodiment of the invention, and shows the light diffusing sheet incorporated in a backlight unit of the direct light type indicated by the imaginary lines.

This light diffusing sheet 14 comprises: a core layer 1 made of a light-transmitting resin; a surface layer 6 which is made of a light-transmitting resin and has been laminated to the upper surface, i.e., the light emission side, of the core layer 1 and in which fine recesses 3 having the shape of an inverted regular quadrangular pyramid have been continuously formed in a lengthwise/crosswise arrangement in the surface thereof; and a functional layer 9 having light-transmitting properties laminated to the lower surface of the core layer 1, i.e., to the side opposite to the surface having the fine recesses 3 formed therein. This light diffusing sheet 14 is intended to be incorporated into a backlight unit of the direct light type indicated by the imaginary lines in FIG. 7 so that it is disposed between the light sources 40 and the lens film 30. Because of this, the overall thickness thereof has been regulated to about 0.3-5 mm to impart strength and rigidity thereto.

Although the core layer 1 of this light diffusing sheet 14 is made of the light-transmitting resin described above, it has a considerably larger thickness than the core layers 1 of the light diffusing sheets 12 and 13 of Examples 3 and 4. It is therefore preferred that this core layer 1 be made of a resin having excellent transparency and a high total light transmittance, such as a polycarbonate or acrylic resin, and contain 1-10% by mass light diffusing agent comprising organic-polymer particles to thereby enable a light diffusing sheet 14 having a high luminance and high haze to be obtained. However, for obtaining a light diffusing sheet 14 having a higher luminance, a core layer 1 containing no light diffusing agent may be employed. It is also possible to incorporate a light diffusing agent comprising inorganic particles or the like.

In this light diffusing sheet 14, the surface layer 6 also contains no light diffusing agent so as to improve luminance. It is, however, a matter of course that a light diffusing agent comprising organic-polymer particles or the like may be contained according to need. This surface layer 6 may be formed simultaneously with the core layer 1 by subjecting the light-transmitting resin having a high total light transmittance to multilayer extrusion molding. Alternatively, the surface layer 6 may be formed by superposing and uniting a film made of the light-transmitting resin by a technique such as laminating, transfer, or hot-pressing. In this light diffusing sheet 14, fine recesses 3 having a depth smaller than the thickness of the surface layer 6 have been formed in order. However, in the case where the surface layer 6 is thin, it is, of course, possible to form fine recesses 3 having such a depth that the recesses 3 penetrate through this surface layer 6 and reach the core layer 1. The fine recesses 3 have the same constitution as in the light diffusing sheet 10 and an explanation thereon is hence omitted. In some cases, a constitution may be employed in which the surface layer 6 is omitted and fine recesses 3 are formed in order in the upper surface of the core layer 1. In this case, the light diffusing sheet has a two-layer structure composed of the core layer 1 and the functional layer 9.

The functional layer 9 superposed on the lower surface of the core layer 1 serves to impart any of various functions to this light diffusing sheet 14. Typical examples thereof are an ultraviolet-absorbing layer having light-transmitting properties which is made of the light-transmitting resin containing a known ultraviolet absorber and an antistatic layer having light-transmitting properties and containing a conductive material (e.g., a metal oxide or carbon nanotubes). The ultraviolet-absorbing layer is effective when the core layer 1 is made of a resin susceptible to deterioration by ultraviolet, such as, e.g., a polycarbonate. When the light diffusing sheet 14 having such an ultraviolet-absorbing layer disposed on the light entrance side is incorporated into a backlight unit of the direct light type so that the light diffusing sheet 14 is disposed in front of the cold cathode fluorescent tubes 40, then the core layer 1 can be inhibited from being deteriorated by the ultraviolet emitted from the cold cathode fluorescent tubes 40. The core layer 1 can be thus inhibited from yellowing and causing a decrease in luminance. On the other hand, the antistatic layer has an advantage that it prevents the light diffusing sheet from being electrostatically charged and thus suffering dust particle adhesion thereto to cause a decrease in luminance. The functional layer 9 may consist of a single layer or be composed of two or more layers. For example, it may be formed by superposing the antistatic layer on the ultraviolet-absorbing layer.

The light diffusing sheet 14 of Example 5 described above can be efficiently produced, for example, by subjecting a light-transmitting resin for core layer formation, a light-transmitting resin for surface layer formation, and a light-transmitting resin for functional-layer formation (e.g., a resin containing an ultraviolet absorber) to three-layer coextrusion molding in such a manner that the surface-layer resin and the functional-layer resin are superposed respectively on the upper and lower sides of the core-layer resin and then passing the resultant sheet through the nip between an embossing roll and a support roll to form fine recesses 3 in order in the surface layer 6.

This light diffusing sheet 14 of Example 5 is incorporated into a backlight unit of the direct light type so that it is disposed between the light sources 40 (cold cathode fluorescent tubes) and the lens film 30 and that the surface having the fine recesses 3 formed therein serves as a light emission side. When this backlight unit is used, the light which was emitted from the light sources 40 and has entered the light diffusing sheet 14 is converted to diffused light having a small brightness peak angle by the fine recesses 3 and led to the lens film 30. The diffused light is further brought to the front direction by this lens film 30, whereby the luminance of the screen of a liquid-crystal display or the like can be heightened. In addition, various functions can be performed by the functional layer 9. It is a matter of course that by reducing the thickness of this light diffusing sheet 14, it is made usable in a backlight unit of the edge light type.

The backlight unit of the edge light type of the invention comprises, as shown in FIG. 1: a lightguide plate 20; a light source 40, e.g., a cold cathode fluorescent tube, disposed along one edge or each of both edges of the lightguide plate 20; a light reflection sheet 50 disposed under (at the back of) the lightguide plate 20; the light diffusing sheet 10, 11, 12, 13, or 14 having a thickness of 50-300 µm disposed over (in front of) the lightguide plate 20 so that the surface thereof having the fine recesses 3 formed therein serves as a light emission side; and a lens film 30 disposed over (in front of) this light diffusing sheet. As described above, when the backlight unit having such a constitution is disposed at the back of the screen of a liquid-crystal display, then the light which has entered the light diffusing sheet through the lightguide plate 20 is converted to diffused light having a small brightness peak angle by the fine recesses 3 and this diffused light is further brought to the front direction by the lens film 30. Thus, the luminance of the liquid-crystal display screen or the like can be heightened.

Although a lens film 30 is used in FIG. 1, the backlight unit may be one in which the lens film is omitted and two or more light diffusing sheets of the invention are used.

The backlight unit of the direct light type of the invention comprises, as shown in FIG. 7: light sources 40 such as, e.g., cold cathode fluorescent tubes; reflectors 50 disposed at the back of the light sources 40; the light diffusing sheet 10, 11, 12, 13, or 14 having a thickness of 0.3-5 mm disposed in front of the light sources 40 so that the surface thereof having the fine recesses 3 formed therein serves as a light emission side; and a lens film 30 disposed over (in front of) this light diffusing sheet. When the backlight unit having such a constitution is disposed at the back of the screen of a liquid-crystal display, the light emitted from the light sources 40 and the light reflected by the reflectors 50 enter the light diffusing sheet and are converted by the fine recesses 3 to diffused light having a small brightness peak angle. This diffused light is further brought to the front direction by the lens film 30. Thus, the luminance of the liquid-crystal display screen can be heightened.

Although a lens film 30 is used in FIG. 7, the backlight unit may be one in which the lens film is omitted and two or more light diffusing sheets of the invention are used.

In the backlight units of the edge light type and direct light type described above, the lens film 30 may be omitted when it is not necessary to further bring the diffused light having a small brightness peak angle to the front direction with the lens film 30.

Next, Experimental Examples for the invention and Comparative Examples will be explained.

EXPERIMENTAL EXAMPLE 1

Using a three-layer coextrusion molding machine, molten-state polypropylene evenly containing 21% by mass talc particles having an average particle diameter of 7.2 μm as a light diffusing agent was extruded into a sheet form having a thickness of 108 μm and, simultaneously therewith, polypropylene containing 30% by mass A-glass light diffusing agent was coextruded and superposed in a thickness of 11 μm on each of the upper and lower sides of that extrudate. Thus, a light-transmitting laminated sheet of a three-layer structure having an overall thickness of 130 μm was continuously molded. This laminated sheet was passed through the nip between an embossing roll having innumerable fine projections which had the shape of a regular quadrangular pyramid and had been continuously formed in order on the roll surface along the circumferential direction and axial direction and a support roll having a smooth surface. Thus, a light diffusing sheet was obtained in which one upper surface thereof serving as a light emission side had fine recesses having the shape of an inverted regular quadrangular pyramid (depth of deepest part, about 95 μm; bevel of inclined faces, about 25°; length of each side, about 400 μm) continuously formed therein in a lengthwise/crosswise arrangement and the other lower surface thereof serving as a light entrance side was flat (proportion of the area occupied by the recesses, 100%).

This light diffusing sheet was measured for total light transmittance and haze with hazeometer NDH 2000 [manufactured by Nippon Denshoku Industries Co., Ltd.]. As a result, the total light transmittance and haze thereof were found to be 89.7% and 90.9%, respectively, as shown in Table 1 given later.

Subsequently, the light diffusing sheet was placed on the lightguide plate of a backlight unit of the edge light type for liquid-crystal displays, and the light source was switched on. A luminance meter [BM-7, manufactured by Topcon Corp.] was disposed at a distance of 35 cm from the light diffusing sheet to measure the luminance. As a result, the luminance was found to be 1,854 cd/m$^2$ as shown in Table 1.

Figure 10:
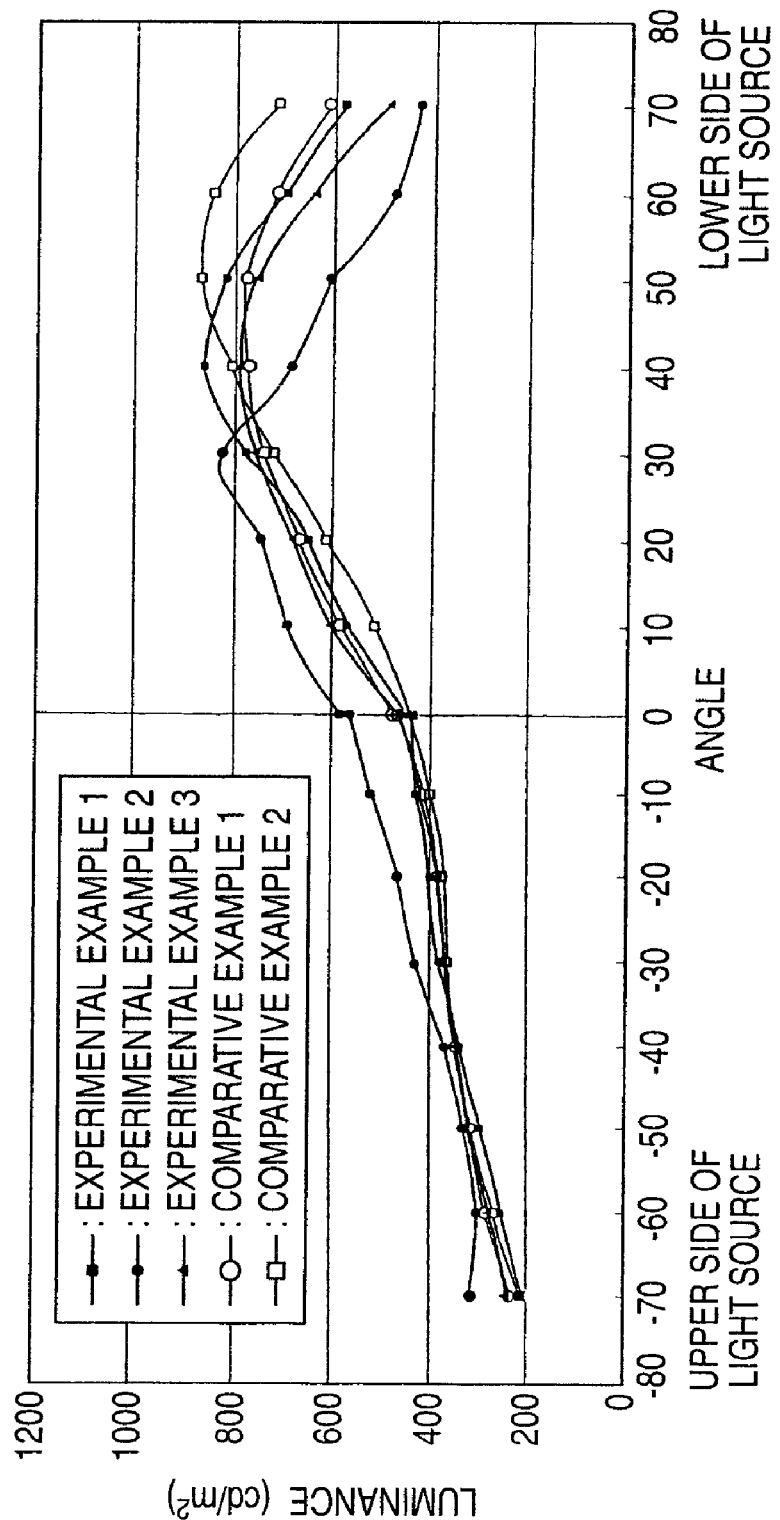
FIG. 10 is a graphic presentation showing the relationship between bevel in the upward/downward direction and luminance in light diffusing sheets.
Figure 11:
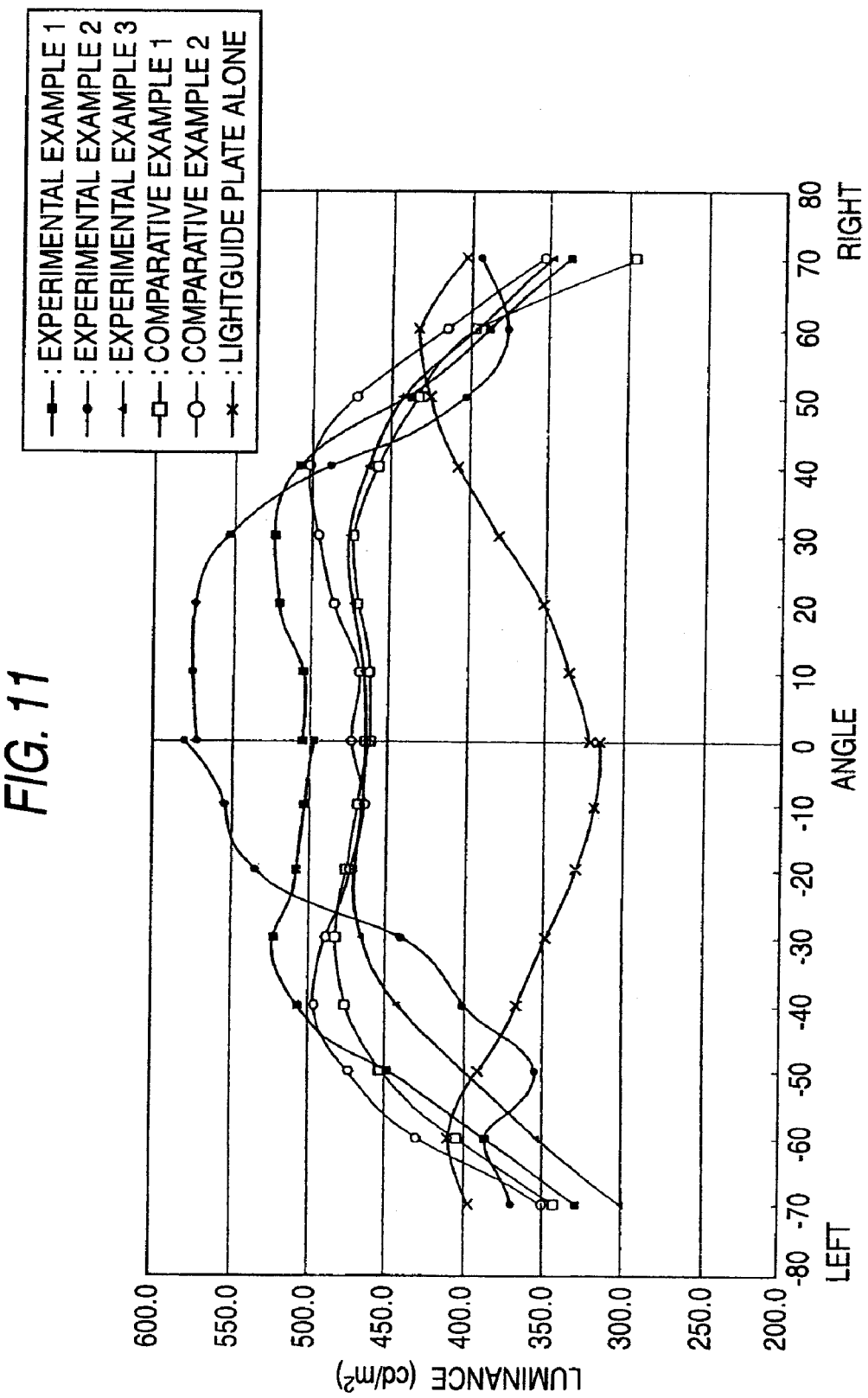
FIG. 11 is a graphic presentation showing the relationship between bevel in the leftward/rightward direction and luminance in the light diffusing sheets.

Furthermore, the luminance was measured while varying the angle by inclining the backlight unit upward and downward in such a manner that the light source revolved from the upper to the lower side. The results obtained are shown in FIG. 10. Moreover, the luminance was measured while varying the angle by inclining the backlight unit leftward and rightward, and the results obtained are shown in FIG. 11.

In the luminance measurements, whether the dots on the back side of the lightguide plate were hidden or not was visually examined. As a result, the dots were completely hidden and were unable to be visually recognized. The dot-hiding properties were satisfactory. The backlight unit was further visually examined for rumpling. As a result, no rumples were observed. The results of these examinations also are shown in Table 1.

Incidentally, a moiré was slightly observed when the light diffusing sheet of Experimental Example 1 was used. However, when a light diffusing sheet prepared by obliquely cutting that light diffusing sheet at an angle of 45° (a light diffusing sheet in which recesses having the shape of an inverted regular quadrangular pyramid had been continuously formed in an oblique-line arrangement) was placed on the lightguide plate of a backlight unit in the same manner as described above, then no moiré was observed at all.

EXPERIMENTAL EXAMPLE 2

A light diffusing sheet (proportion of the area occupied by recesses, 100%) was obtained in the same manner as in Experimental Example 1, except that fine recesses having the shape of an inverted regular quadrangular pyramid having a depth of the deepest part of about 85 μm, bevel of the inclined faces of about 45°, and length of each side of about 200 μm were continuously formed in a lengthwise/crosswise arrangement in the upper surface serving as a light emission side by replacing the embossing roll with another one.

This light diffusing sheet was measured for total light transmittance, haze, and luminance in the same manners as in Experimental Example 1. The results obtained are shown in Table 1 given later. A backlight unit having the light diffusing sheet incorporated therein was measured for luminance while varying the angle by inclining the unit upward and downward and by inclining it leftward and rightward, in the same manner as in Experimental Example 1. The results of these measurements are shown in FIG. 10 and FIG. 11, respectively. Furthermore, the backlight unit was visually examined as to whether the dot-hiding properties were satisfactory and whether rumples were observed, in the same manners as in Experimental Example 1. The results thereof are shown in Table 1 given later.

EXPERIMENTAL EXAMPLE 3

A light diffusing sheet was obtained in the same manner as in Experimental Example 1, except that an embossing roll in which innumerable fine projections of a nearly semispherical shape had been continuously formed in order on the roll surface along the circumferential direction and axial direction was used in place of the embossing roll used in Experimental Example 1. The light diffusing sheet thus obtained had innumerable fine recesses having a nearly semispherical shape (the shape of an inverted truncated cone in which the cut surface was concave and which was nearly semispherical; diameter, about 60 μm) formed in order in the upper surface thereof serving as a light emission side.

This light diffusing sheet was measured for total light transmittance, haze, and luminance in the same manners as in Experimental Example 1. The results obtained are shown in Table 1 given later. A backlight unit having the light diffusing sheet incorporated therein was measured for luminance while varying the angle by inclining the unit upward and downward and by inclining it leftward and rightward, in the same manner as in Experimental Example 1. The results of these measurements are shown in FIG. 10 and FIG. 11, respectively. Furthermore, the backlight unit was visually examined as to whether the dot-hiding properties were satisfactory and whether rumples were observed, in the same manners as in Experimental Example 1. The results thereof are shown in Table 1 given later.

COMPARATIVE EXAMPLE 1

A light diffusing sheet having microfine recesses and protrusions formed on the upper surface thereof serving as a light emission side was produced in the same manner as in Experimental Example 1, except that a matte roll having microfine recesses and protrusions on the surface thereof was used in place of the embossing roll used in Experimental Example 1.

This light diffusing sheet was measured for total light transmittance, haze, and luminance in the same manners as in Experimental Example 1. The results obtained are shown in Table 1 given later. A backlight unit having the light diffusing sheet incorporated therein was measured for luminance while varying the angle by inclining the unit upward and downward and by inclining it leftward and rightward, in the same manner as in Experimental Example 1. The results of these measurements are shown in FIG. 10 and FIG. 11, respectively. Furthermore, the backlight unit was visually examined as to whether the dot-hiding properties were satisfactory and whether rumples were observed, in the same manners as in Experimental Example 1. The results thereof are shown in Table 1 given later.

COMPARATIVE EXAMPLE 2

A light diffusing sheet having innumerable fine projections having a nearly semispherical shape formed on the upper surface thereof serving as a light emission side was obtained in the same manner as in Experimental Example 1, except that an embossing roll having innumerable fine semispherical recesses in the surface thereof was used in place of the embossing roll used in Experimental Example 1.

This light diffusing sheet was measured for total light transmittance, haze, and luminance in the same manners as in Experimental Example 1. The results obtained are shown in Table 1 given below. A backlight unit having the light diffusing sheet incorporated therein was measured for luminance while varying the angle by inclining the unit upward and downward and by inclining it leftward and rightward, in the same manner as in Experimental Example 1. The results of these measurements are shown in FIG. 10 and FIG. 11, respectively. Furthermore, the backlight unit was visually examined as to whether the dot-hiding properties were satisfactory and whether rumples were observed, in the same manners as in Experimental Example 1. The results thereof are shown in Table 1 given below.

A backlight unit having no light diffusing sheet was also measured for luminance while varying the angle by inclining the unit leftward and rightward. The results thereof are shown in FIG. 11.

TABLE 1

|  | Experimental Example 1 | Experimental Example 2 | Experimental Example 3 | Comparative Example 1 | Comparative Example 2 |
|---|---|---|---|---|---|
| One upper surface (light emission side) | recesses of inverted regular quadrangular pyramid shape (bevel, 25°) | recesses of inverted regular quadrangular pyramid shape (bevel, 45°) | recesses of nearly semispherical shape | microfine recesses and protrusions | projections of nearly semispherical shape |
| Other lower surface (light entrance side) | flat | flat | flat | flat | flat |
| Total light transmittance % | 89.7 | 71.2 | 87.9 | 89.9 | 90.5 |
| Haze % | 90.9 | 90.7 | 87.2 | 87.5 | 90.0 |
| Luminance cd/m$^2$ | 1854 | 1885 | 1834 | 1815 | 1817 |
| Dot-hiding property | A | A | A | A | A |
| Rumpling | none | none | none | none | none |

The following can be seen from Table 1. The light diffusing sheets of Experimental Examples 1, 2, and 3 according to the invention and the light diffusing sheets of Comparative Examples 1 and 2, which contain a light diffusing agent, each have a haze of 87% or higher, which is satisfactory. There is almost no difference in haze between the light diffusing sheets of the Experimental Examples and the light diffusing sheets of the Comparative Examples. It can hence be seen that there is no difference in dot-hiding properties between these. However, the luminances in Experimental Examples 1, 2, and 3 are as high as 1,834 cd/m$^2$ or above, whereas the luminances in Comparative Examples 1 and 2 are as low as 1,817 cd/m$^2$ or below. It can be seen that the light diffusing sheets having fine recesses having the shape of an inverted regular quadrangular pyramid or a nearly semispherical shape have a better luminance than the light diffusing sheet having microfine recesses and protrusions and the light diffusing sheet having semispherical projections. In particular, the light diffusing sheets of Experimental Examples 1 and 2, which have fine recesses having the shape of an inverted regular quadrangular pyramid, have a luminance higher by as large as 70-37 cd/m$^2$ than those in Comparative Examples 1 and 2 and by as large as 51-20 cd/m$^2$ than that of the light diffusing sheet of Experimental Example 3, which has nearly semispherical recesses. The light diffusing sheets of Experimental Examples 1 and 2 are found to have excellent condensing ability. A comparison between the light diffusing sheet of Experimental Example 1, which has fine recesses in which the inclined faces have a bevel of 25°, and the light diffusing sheet of Experimental Example 2, which has fine recesses in which the inclined faces have a bevel of 45°, shows that the light diffusing sheet of Experimental Example 2 has a luminance higher by as large as 31 cd/m$^2$ than that of the light diffusing sheet of Experimental Example 1. It can be seen from these results that the light diffusing sheet in which the bevel of the inclined faces of the recesses is 40° or larger is more effective in luminance enhancement than that in which the bevel is smaller than 40°.

In Table 1, symbol A indicates that the light diffusing sheet has satisfactory dot-hiding properties.

FIG. 11 shows that in the range of from 45° right to 45° left, the luminances of the light diffusing sheets of Experimental Examples 1 and 2, which have fine recesses having the shape of an inverted regular quadrangular pyramid and formed in a lengthwise/crosswise arrangement, are higher than the luminances of the light diffusing sheet of Experimental Example 3, which has nearly semispherical fine recesses, the light diffusing sheet of Comparative Example 1, which has microfine recesses and protrusions formed randomly, and the light diffusing sheet of Comparative Example 2, which has semispherical projections. It can be seen from these results that in the range of from 45° right to 45° left, the light diffusing sheets of Experimental Examples 1 and 2, in which fine recesses having the shape of an inverted regular quadrangular pyramid have been formed in order, are superior in the property of condensing diffused light to the light diffusing sheet of Experimental Example 3 or the light diffusing sheets of Comparative Examples 1 and 2.

The following can be further seen from FIG. 11. The light-guide plate alone having no light diffusing sheet superposed thereon has a brightness peak at each of around 60° right and around 60° left. In contrast, the light diffusing sheets of Comparative Examples 1 and 2 and Experimental Example 3 each have a brightness peak at each of around 30°-40° right and around 30°-40° left. Furthermore, the light diffusing sheets of Experimental Examples 1 and 2, in which fine recesses having the shape of an inverted regular quadrangular pyramid have been formed in order, each have a brightness peak at each of around 30° right and around 30° left. On the other hand, FIG. 10 shows that the light diffusing sheets of Comparative Examples 1 and 2 each have a brightness peak at around 50° (lower side of the light source), while the light diffusing sheets of Experimental Examples 1, 2, and 3 each have a brightness peak at around 40° (lower side of the light source).

From those results, the following can be seen. The light diffusing sheets of Experimental Examples 1, 2, and 3 and Comparative Examples 1 and 2 each have the effect of reducing the brightness peak angle. However, the light diffusing sheets of Experimental Examples 1, 2, and 3, in which fine recesses having the shape of an inverted regular quadrangular pyramid or a semispherical shape (the shape of an inverted truncated cone in which the cut surface is concave) have been formed in order, are more effective in reducing the brightness peak angle than the light diffusing sheets of Comparative Examples 1 and 2, in which projections or random recesses and protrusions have been formed. In Experimental Examples 1, 2, and 3, the light is further brought to the front direction (the direction perpendicular to the screen of the liquid-crystal display) by the lens film to improve the brightness as measured from the central direction in front of the liquid-crystal display screen. In particular, Experimental Examples 1 and 2, in which fine recesses having the shape of an inverted regular quadrangular pyramid have been formed in order, are effective in further reducing the brightness peak angle as compared with Experimental Example 3, in which nearly semispherical fine recesses have been formed in order, and thereby improving the brightness as measured from the central front direction.

Furthermore, as Table 1 shows, the light diffusing sheets of Experimental Examples 1, 2, and 3 and Comparative Examples 1 and 2, which each contain a light diffusing agent, each have a haze as high as 87% or above and show satisfactory dot-hiding properties. No rumples are observed therein.

EXPERIMENTAL EXAMPLE 4

Using a single-layer extrusion molding machine, molten-state polypropylene was extruded into a sheet form having a thickness of 145 μm. This sheet was passed through the nip between an embossing roll having innumerable fine projections which had the shape of a truncated regular quadrangular pyramid (regular quadrangular prismoid) and had been continuously formed in order on the roll surface along the circumferential direction and axial direction so as to be slightly spaced from one another and a support roll whose surface had been finely embossed. Thus, a light diffusing sheet was obtained in which one upper surface thereof serving as a light emission side had fine recesses having the shape of an inverted truncated regular quadrangular pyramid (inverted regular quadrangular prismoid) (depth of deepest part, about 85 μm; bevel of inclined faces, about 45°; length of each side in the upper surface, about 200 μm; space between recesses, 10 μm) continuously formed therein in a lengthwise/crosswise arrangement and the other lower surface had microfine recesses and protrusions which were finer than those fine recesses (proportion of the area occupied by the fine recesses, 92%).

Figure 12:
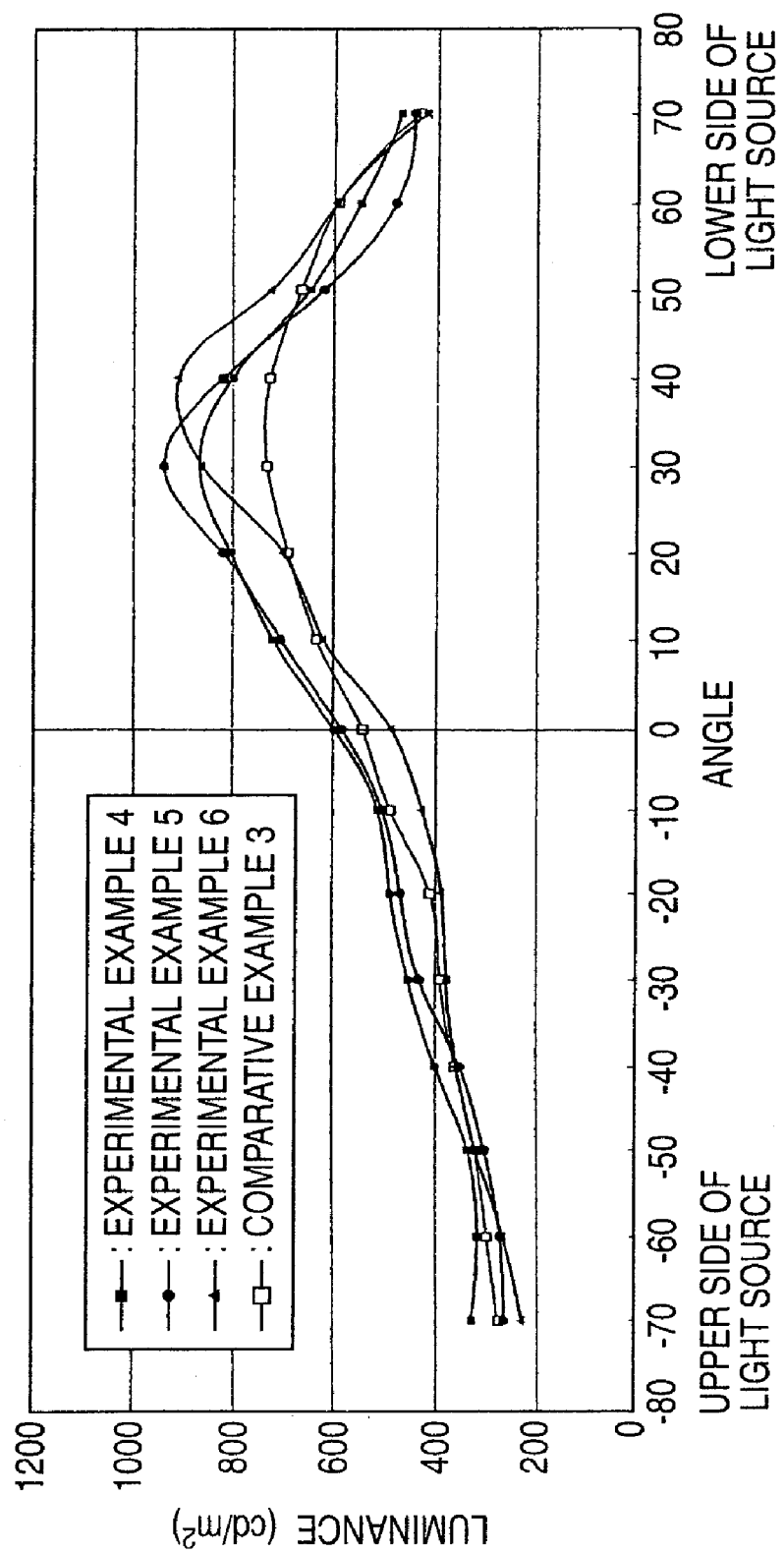
FIG. 12 is a graphic presentation showing the relationship between bevel in the upward/downward direction and luminance in other light diffusing sheets.
Figure 13:
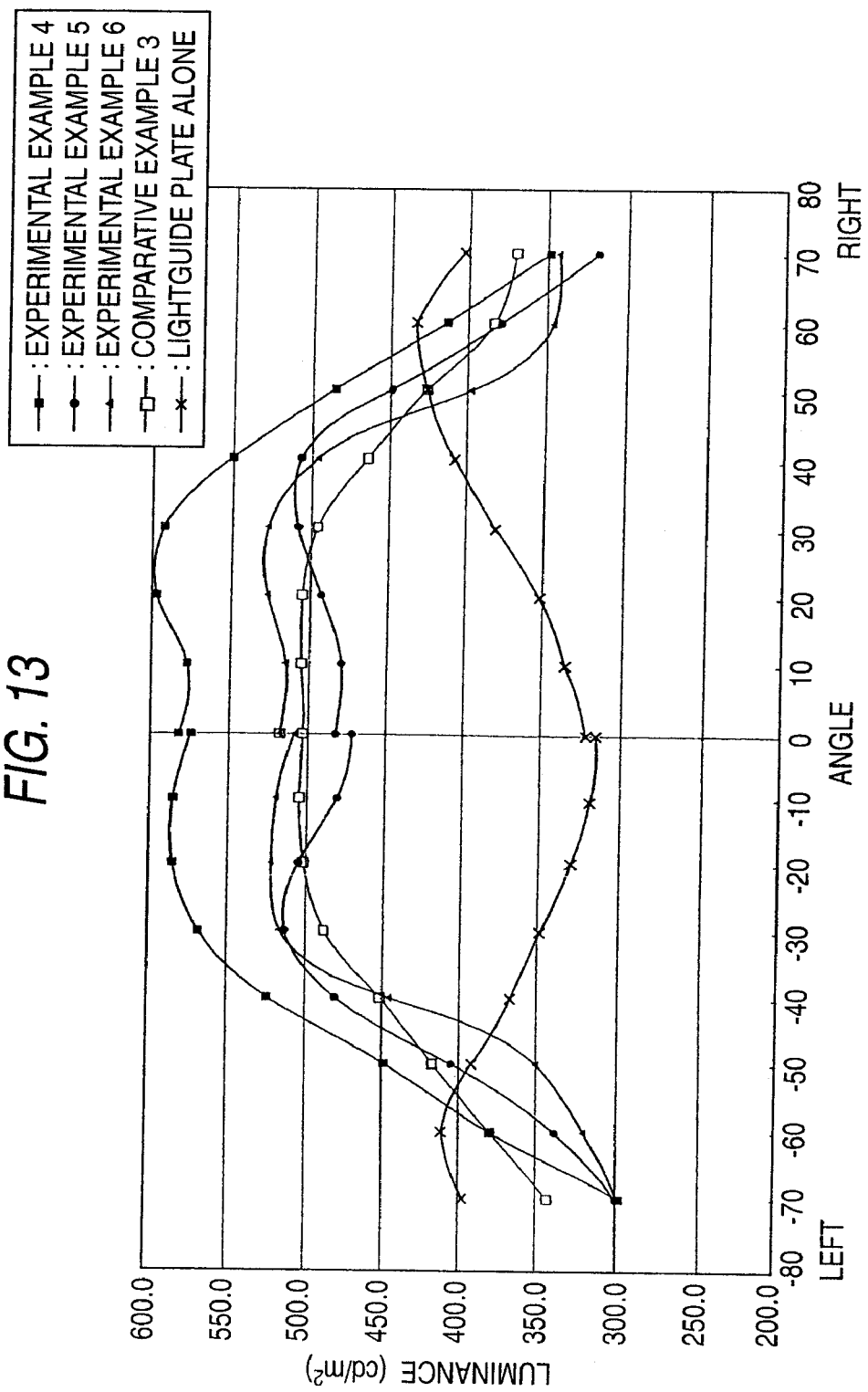
FIG. 13 is a graphic presentation showing the relationship between bevel in the leftward/rightward direction and luminance in the light diffusing sheets.

This light diffusing sheet was measured for total light transmittance and haze in the same manners as in Experimental Example 1. The results obtained are shown in Table 2 given later. A backlight unit of the edge light type having the light diffusing sheet incorporated therein was measured for luminance while varying the angle by inclining the unit upward and downward and by inclining it leftward and rightward, in the same manner as in Experimental Example 1. The results of these measurements are shown in FIG. 12 and FIG. 13, respectively. Furthermore, the backlight unit was visually examined as to whether the dot-hiding properties were satisfactory and whether rumples were observed, in the same manners as in Experimental Example 1. The results thereof are shown in Table 2 given later. The arithmetic mean deviation of the profile of the microfine recesses and protrusions on the lower surface of this light diffusing sheet was determined with DEKTAK IIA, manufactured by ULVAC Corp., in accordance with JIS B 0601. The results thereof are also shown in Table 2.

EXPERIMENTAL EXAMPLE 5

A light diffusing sheet in which the same fine recesses as in Experimental Example 4, which had the shape of an inverted truncated regular quadrangular pyramid, had been formed in order in the upper surface thereof was obtained in the same manner as in Experimental Example 4, except that the support roll was replaced by a roll having a smooth surface to thereby make the lower surface serving as a light entrance side flat.

This light diffusing sheet was measured for total light transmittance, haze, dot-hiding properties, rumpling, and arithmetic mean deviation of the profile in the same manners as in Experimental Example 1. The results obtained are shown in Table 2 given later. Furthermore, a backlight unit having the light diffusing sheet incorporated therein was measured for luminance while varying the angle by inclining the unit upward and downward and by inclining it leftward and rightward, in the same manner as in Experimental Example 1. The results of these measurements are shown in FIG. 12 and FIG. 13, respectively.

EXPERIMENTAL EXAMPLE 6

A light diffusing sheet was obtained in the same manner as in Experimental Example 4, except that fine recesses having the shape of an inverted regular quadrangular pyramid (depth of deepest part, about 95 μm; bevel of inclined faces, about 25°; length of each side in the upper surface, about 380 μm; space between recesses, 20 μm) were continuously formed in a lengthwise/crosswise arrangement in the upper surface serving as a light emission side by replacing the embossing roll with another one.

This light diffusing sheet was measured for total light transmittance, haze, dot-hiding properties, rumpling, and arithmetic mean deviation of the profile in the same manners as in Experimental Example 1. The results obtained are shown in Table 2 given later. Furthermore, a backlight unit having the light diffusing sheet incorporated therein was measured for luminance while varying the angle by inclining the unit upward and downward and by inclining it leftward and rightward, in the same manner as in Experimental Example 1. The results of these measurements are shown in FIG. 12 and FIG. 13, respectively.

COMPARATIVE EXAMPLE 3

A light diffusing sheet having microfine recesses and protrusions randomly formed on the upper surface thereof serving as a light emission side and on the lower surface thereof serving as a light entrance side was obtained in the same manner as in Experimental Example 4, except that the embossing roll was replaced by a roll having microfine recesses and protrusions.

This light diffusing sheet was measured for total light transmittance, haze, dot-hiding properties, rumpling, and arithmetic mean deviation of the profile in the same manners as in Experimental Example 1. The results obtained are shown in Table 2 given below. Furthermore, a backlight unit having the light diffusing sheet incorporated therein was measured for luminance while varying the angle by inclining the unit upward and downward and by inclining it leftward and rightward, in the same manner as in Experimental Example 1. The results of these measurements are shown in FIG. 12 and FIG. 13, respectively.

TABLE 2

|  | Experimental Example 4 | Experimental Example 5 | Experimental Example 6 | Comparative Example 3 |
|---|---|---|---|---|
| One upper surface (light emission side) | recesses of inverted regular quadrangular prismoid | recesses of inverted regular quadrangular prismoid | recesses of inverted regular quadrangular | microfine recesses and protrusions |

TABLE 2-continued

|  | Experimental Example 4 | Experimental Example 5 | Experimental Example 6 | Comparative Example 3 |
|---|---|---|---|---|
|  | shape (bevel, 45°) | shape (bevel, 25°) | pyramid shape (bevel, 45°) |  |
| Other lower surface (light entrance side) | microfine recesses and protrusions | flat | microfine recesses and protrusions | microfine recesses and protrusions |
| Total light transmittance % | 68.9 | 75.7 | 92.7 | 84.3 |
| Haze % | 91.4 | 90.6 | 91.4 | 90.2 |
| Luminance cd/m² | 1890 | 1964 | 1876 | 1843 |
| Dot-hiding property | A | A | A | A |
| Rumpling | none | none | none | none |
| Ra of light entrance side μm | 8.44 | 0.80 | 1.51 | 4.74 |

It can be seen from Table 2 that the light diffusing sheets of Experimental Examples 4, 5, and 6 according to the invention and the light diffusing sheet of Comparative Example 3, which contain no light diffusing agent and have a single-layer structure, each have a haze of 90% or higher, which is satisfactory. There is almost no difference between the Experimental Examples and Comparative Example 3. With respect to luminance, however, the Experimental Examples are superior. Namely, as Table 2 shows, the luminances in the Experimental Examples are higher by as large as 33-121 cd/m² than that in Comparative Example 3. It can hence be seen that the light diffusing sheets which have fine recesses having the shape of an inverted regular quadrangular prismoid (inverted truncated regular quadrangular pyramid) or inverted regular quadrangular pyramid formed in the light emission side thereof (upper surface) have a better luminance than the light diffusing sheet having microfine recesses and protrusions and can be used to assemble a bright backlight unit. A comparison between Experimental Example 4 and Experimental Example 5 shows that the light diffusing sheet of Experimental Example 5 has a sufficient luminance and a sufficient total light transmittance although the lower surface thereof has no microfine recesses and protrusions.

In Table 2, symbol A indicates that the light diffusing sheet has satisfactory dot-hiding properties.

FIG. 13 shows that in the range of from 45° right to 45° left, the luminance of the light diffusing sheet of Experimental Example 4, which has fine recesses having the shape of an inverted truncated regular quadrangular pyramid formed in a lengthwise/crosswise arrangement in the upper surface thereof and further has microfine recesses and protrusions randomly formed on the lower surface thereof, is higher by as large as 70-100 cd/m² than the luminance of the light diffusing sheet of Comparative Example 3, which has microfine recesses and protrusions randomly formed on each surface thereof. It can be seen from these results that in the range of from 45° right to 45° left, the light diffusing sheet of Experimental Example 4, which has fine recesses having the shape of an inverted truncated regular quadrangular pyramid formed in order, is superior in the property of condensing diffused light to the light diffusing sheet of Comparative Example 2.

The following can be further seen from FIG. 12. The light diffusing sheet of Comparative Example 3 has a brightness peak of about 720 cd/m² at around 30°-40° right, whereas the light diffusing sheets of Experimental Examples 4, 5, and 6, in which fine recesses having the shape of an inverted truncated regular quadrangular pyramid or inverted regular quadrangular pyramid have been formed in order, have a brightness peak of about 850-950 cd/m² at around 30-40° right. It can be seen from these results that the light diffusing sheets of Experimental Examples 4, 5, and 6 each have a small brightness peak angle and a high luminance.

To sum up, it can be seen from Table 2 and FIGS. 12 and 13 that when the light diffusing sheets of Experimental Examples 4, 5, and 6 are incorporated into a backlight unit of the edge light type for liquid-crystal displays or the like, diffused light having a small brightness peak angle can be brought to the front direction by the lens film to thereby heighten the luminance of the liquid-crystal display screen.

EXPERIMENTAL EXAMPLE 7

Using a single-layer extrusion molding machine, a molten-state polycarbonate was extruded into a sheet form having a thickness of 130 μm. This sheet was passed through the nip between an embossing roll having innumerable fine projections which had the shape of a truncated regular quadrangular pyramid (regular quadrangular prismoid) and had been continuously formed in order on the roll surface along the circumferential direction and axial direction so as to be slightly spaced from one another and a support roll having a smooth surface. Thus, a light diffusing sheet was obtained in which one upper surface thereof serving as a light emission side had fine recesses having the shape of an inverted truncated regular quadrangular pyramid (depth of deepest part, 45.3 μm; bevel of inclined faces, about 40°; length of each side in the upper surface, 125 μm; space between recesses, 174 μm) continuously formed therein in a lengthwise/crosswise arrangement and the lower surface thereof serving as a light entrance side was flat (proportion of the area occupied by the fine recesses, 52%).

This light diffusing sheet was measured for total light transmittance, haze, and luminance in the same manners as in Experimental Example 1. The results obtained are shown in Table 3 given later. Furthermore, the backlight unit was visually examined as to whether the dot-hiding properties were satisfactory and whether rumples were observed, in the same manners as in Experimental Example 1. The results thereof are shown in Table 3 given later. The arithmetic mean deviation of the profile of the microfine recesses and protrusions on the lower surface of this light diffusing sheet was determined with DEKTAK IIA, manufactured by ULVAC Corp., in accordance with JIS B 0601. The results thereof are also shown in Table 3.

EXPERIMENTAL EXAMPLE 8

A light diffusing sheet was produced in the same manner as in Experimental Example 7, except that the embossing roll was replaced by another one to continuously form fine recesses having the shape of an inverted truncated regular quadrangular pyramid (depth of deepest part, 40.6 μm; bevel of inclined faces, about 55°; length of each side in the upper surface, 68.0 μm; space between recesses, 120 μm) in a lengthwise/crosswise arrangement in one upper sheet surface serving as a light emission side. This light diffusing sheet was examined for total light transmittance, haze, luminance, dot-hiding properties, and rumpling in the same manners as in Experimental Example 1, and the results thereof are shown in Table 3 given later. Furthermore, the arithmetic mean deviation of the profile of the recesses and protrusions on the lower surface was determined in the same manner as in Experimental Example 7, and the results thereof are shown in Table 3.

EXPERIMENTAL EXAMPLES 9 and 10

The same procedures as in Experimental Examples 7 and 8 were conducted, except that a matte roll having microfine recesses and protrusions on the surface thereof was used as a support roll in place of the support roll used in Experimental Examples 7 and 8. Thus, a light diffusing sheet (Experimental Example 9) which was the light diffusing sheet of Experimental Example 7 having microfine recesses and protrusions formed on the lower surface thereof serving as a light entrance side and a light diffusing sheet (Experimental Example 10) which was the light diffusing sheet of Experimental Example 8 having microfine recesses and protrusions formed on the lower surface thereof serving as a light entrance side were produced. These light diffusing sheets each were examined for total light transmittance, haze, luminance, dot-hiding properties, and rumpling in the same manners as in Experimental Example 1, and the results thereof are shown in Table 3 given later. Furthermore, the arithmetic mean deviation of the profile of the recesses and protrusions on the lower surface was determined in the same manner as in Experimental Example 7, and the results thereof are shown in Table 3.

COMPARATIVE EXAMPLE 4

The same procedure as in Experimental Example 7 was conducted, except that a matte roll having microfine recesses and protrusions on the surface thereof was used in place of each of the embossing roll and support roll used in Experimental Example 7. Thus, a light diffusing sheet was produced which had microfine recesses and protrusions formed on the upper surface thereof serving as a light emission side and on the lower surface thereof serving as a light entrance side. This light diffusing sheet was examined for total light transmittance, haze, luminance, dot-hiding properties, and rumpling in the same manners as in Experimental Example 1, and the results thereof are shown in Table 3 given below. Furthermore, the arithmetic mean deviation of the profile of the recesses and protrusions on the lower surface was determined in the same manner as in Experimental Example 7, and the results thereof are shown in Table 3.

TABLE 3

|  | Experimental Example 7 | Experimental Example 8 | Experimental Example 9 | Experimental Example 10 | Comparative Example 4 |
|---|---|---|---|---|---|
| One upper surface (light emission side) | recesses of inverted regular quadrangular prismoid | recesses of inverted regular quadrangular prismoid | recesses of inverted regular quadrangular prismoid | recesses of inverted regular quadrangular prismoid | microfine recesses and protrusions |

TABLE 3-continued

|  |  | Experimental Example 7 | Experimental Example 8 | Experimental Example 9 | Experimental Example 10 | Comparative Example 4 |
|---|---|---|---|---|---|---|
| Other lower surface (light entrance side) | | shape (bevel, 40°) flat | shape (bevel, 55°) flat | shape (bevel, 40°) microfine recesses and protrusions | shape (bevel, 55°) microfine recesses and protrusions | microfine recesses and protrusions |
| Total light transmittance | % | 94.9 | 84.8 | 93.2 | 92.9 | 84.3 |
| Haze | % | 87.1 | 89.5 | 79.8 | 81.3 | 59.6 |
| Luminance | cd/m² | 1655 | 1654 | 1634 | 1615 | 1590 |
| Dot-hiding property | | A | A | AA | AA | B |
| Rumpling | | none | none | none | none | none |
| Ra of light entrance side | μm | 0.76 | 0.76 | 2.16 | 2.16 | 1.51 |

It can be seen from Table 3 that the light diffusing sheets of Experimental Examples 7 to 10, which have a single-layer structure made of a polycarbonate and have fine recesses of the shape of an inverted regular quadrangular prismoid (inverted truncated regular quadrangular pyramid) formed in the upper surface thereof serving as a light emission side, each have a high total light transmittance and a high haze and are satisfactory in luminance and dot-hiding properties. In contrast, the light diffusing sheet of Comparative Example 4, which have microfine recesses and protrusions formed on each side thereof, shows insufficient light diffusion and has a low haze and poor dot-hiding properties (indicated by B in Table 3). It can also be seen that the luminance thereof is lower by 25-65 cd/m² than those of the light diffusing sheets of Experimental Examples 7 to 10. It can be seen from these results that the fine recesses which have the shape of an inverted regular quadrangular prismoid (inverted truncated regular quadrangular pyramid) having a bevel of inclined faces of 40° or larger and have been formed in order on the light emission side (upper surface) are highly effective in improving luminance without reducing haze. Furthermore, it can be seen that the light diffusing sheets of Experimental Examples 7 to 10 have a high haze and excellent dot-hiding properties although they contain no light diffusing agent.

In Table 3, symbols A and AA indicate that the dot-hiding properties are satisfactory and excellent, respectively.

Incidentally, a comparison between Table 3 and Tables 1 and 2 shows that the values of luminance for the light diffusing sheets of Experimental Examples 7 to 10 as a whole are lower than those for the light diffusing sheets of Experimental Examples 1 to 6. However, such differences are thought to be attributable to the phenomenon in which the luminance of a backlight unit fluctuates with even slight changes in temperature and humidity in the date of measurement.

EXPERIMENTAL EXAMPLES 11 to 14 AND COMPARATIVE EXAMPLE 5

The same procedures as in Experimental Examples 7 to 10 and Comparative Example 4 were conducted, except that a polycarbonate containing 4.0% by mass acrylic beads as a light diffusing agent was used in place of the polycarbonate used in Experimental Examples 7 to 10 and Comparative Example 4. Thus, the following light diffusing sheets were produce: a light diffusing sheet (Experimental Example 11) which was the light diffusing sheet of Experimental Example 7 containing the light diffusing agent, a light diffusing sheet (Experimental Example 12) which was the light diffusing sheet of Experimental Example 8 containing the light diffusing agent, a light diffusing sheet (Experimental Example 13) which was the light diffusing sheet of Experimental Example 9 containing the light diffusing agent, a light diffusing sheet (Experimental Example 14) which was the light diffusing sheet of Experimental Example 10 containing the light diffusing agent, and a light diffusing sheet (Comparative Example 5) which was the light diffusing sheet of Comparative Example 4 containing the light diffusing agent. These light diffusing sheets each were examined for total light transmittance, haze, luminance, dot-hiding properties, and rumpling in the same manners as in Experimental Example 1, and the results thereof are shown in Table 4 given below. Furthermore, the arithmetic mean deviation of the profile of the recesses and protrusions on the lower surface was determined in the same manner as in Experimental Example 7, and the results thereof are shown in Table 4.

TABLE 4

|  | Experimental Example 11 with diffusing agent | Experimental Example 12 with diffusing agent | Experimental Example 13 with diffusing agent | Experimental Example 14 with diffusing agent | Comparative Example 5 with diffusing agent |
|---|---|---|---|---|---|
| One upper surface (light emission side) | recesses of inverted regular quadrangular prismoid shape (bevel, 40°) | recesses of inverted regular quadrangular prismoid shape (bevel, 55°) | recesses of inverted regular quadrangular prismoid shape (bevel, 40°) | recesses of inverted regular quadrangular prismoid shape (bevel, 55°) | microfine recesses and protrusions |

TABLE 4-continued

|  |  | Experimental Example 11 with diffusing agent | Experimental Example 12 with diffusing agent | Experimental Example 13 with diffusing agent | Experimental Example 14 with diffusing agent | Comparative Example 5 with diffusing agent |
|---|---|---|---|---|---|---|
| Other lower surface (light entrance side) | | flat | flat | microfine recesses and protrusions | microfine recesses and protrusions | microfine recesses and protrusions |
| Total light transmittance | % | 91.2 | 88.5 | 93.9 | 93.1 | 91.6 |
| Haze | % | 91.6 | 91.5 | 90.7 | 91.1 | 90.5 |
| Luminance | cd/m$^2$ | 1676 | 1689 | 1679 | 1659 | 1636 |
| Dot-hiding property | | A | AA | AA | AA | B |
| Rumpling | | none | none | none | none | none |
| Ra of light entrance side | μm | 0.76 | 0.76 | 2.16 | 2.16 | 1.51 |

A comparison between Table 4 and Table 3 shows that the light diffusing sheets of Experimental Examples 11 to 14, which contain a light diffusing agent, have an improved haze and an improved luminance as compared with the light diffusing sheets of Experimental Examples 7 to 10, which contain no light diffusing agent. The light diffusing sheet of Experimental Example 12 further has improved dot-hiding properties. It can hence be seen that the light diffusing agent contributes to improvements in haze, luminance, and dot-hiding properties.

INDUSTRIAL APPLICABILITY

The light diffusing sheet of the invention enables incident light to be emitted after having been converted to diffused light having a small brightness peak angle. The light diffusing sheet can thus heighten luminance. In addition, the light diffusing sheet has satisfactory hiding properties to inhibit the generation of a moiré, interference fringe, etc. Consequently, the light diffusing sheet is used in the backlight unit of a liquid-crystal display for notebook type personal computers, personal computer monitors, television receivers, and the like, or in a screen for advertising signboards, illumination, or image displaying, or in an apparatus such as a scanner or copier. The backlight unit of the invention is used as the backlight units of, e.g., liquid-crystal displays for notebook type personal computers, personal computer monitors, television receivers, and other various applications.

The invention claimed is:

1. A light diffusing sheet comprising a core layer made of a light-transmitting resin and containing a light diffusing agent; and
a surface layer laminated to at least one of the surfaces of the core layer and made of a light transmitting resin,
wherein the sheet has a light emission side which is one surface and a light entrance side which is another surface, characterized by having fine recesses formed in the light emission side which is one surface, the fine recesses having a shape which is any of the shape of an inverted polyangular pyramid, the shape of an inverted truncated polyangular pyramid, the shape of an inverted cone, and the shape of an inverted truncated cone.

2. The light diffusing sheet according to claim 1, wherein the recesses have been regularly arranged.

3. The light diffusing sheet according to claim 2, wherein the bevel between the surface having fine recesses formed and each inclined face of each fine recess having the shape of an inverted polyangular pyramid or inverted truncated polyangular pyramid, or the bevel between that surface and the ridgeline of each fine recess having the shape of an inverted cone or inverted truncated cone is 15-70°.

4. The light diffusing sheet according to claim 3, wherein the surface layer contains a light diffusing agent.

5. The light diffusing sheet according to claim 4, wherein the bevel between the surface having fine recesses formed and each inclined face of each fine recess having the shape of an inverted polyangular pyramid or inverted truncated polyangular pyramid, or the bevel between that surface and the ridgeline of each fine recess having the shape of an inverted cone or inverted truncated cone is 35-70°.

6. The light diffusing sheet according to claim 4 or 5, wherein the proportion of the area occupied by the fine recesses in the surface having the fine recesses formed is 30-100%.

7. The light diffusing sheet according to claim 4 or 5, wherein the fine recesses have been formed in an oblique-line arrangement.

8. A backlight unit characterized by including the light diffusing sheet according to claim 6 which has a thickness of 0.3-5 mm and has been disposed in front of a light source, wherein a functional layer having light-transmitting properties has been laminated to the surface of the light diffusing sheet on the side opposite to the surface having fine recesses formed and the functional layer having light-transmitting properties comprises an ultraviolet-absorbing layer and/or an antistatic layer.

9. A light diffusing sheet comprising a core layer made of a light-transmitting resin and containing a light diffusing agent; and
a surface layer laminated to at least one of the surfaces of the core layer and made of a light transmitting resin,
wherein the sheet has a light emission side which is one surface and a light entrance side which is another surface, characterized by having fine recesses formed in the light emission side which is one surface, the fine recesses having a shape which is any of the shape of an inverted polyangular pyramid, the shape of an inverted truncated polyangular pyramid, the shape of an inverted cone, and the shape of an inverted truncated cone,
wherein the recesses have been regularly arranged and formed in an oblique-line arrangement;

the bevel between the surface having fine recesses formed and each inclined face of each fine recess having the shape of an inverted polyangular pyramid or inverted truncated polyangular pyramid, or the bevel between that surface and the ridgeline of each fine recess having the shape of an inverted cone or inverted truncated cone is 35-70°; and the proportion of the area occupied by the fine recesses in the surface having the fine recesses formed is 30-100%.

10. The light diffusing sheet according to claim 9, wherein a functional layer having light-transmitting properties has been laminated to the surface on the side opposite to the surface having fine recesses formed and the functional layer having light-transmitting properties comprises an ultraviolet-absorbing layer and/or an antistatic layer.

11. The light diffusing sheet according to claim 9, wherein the surface on the side opposite to the surface having fine recesses formed has recesses and protrusions which are finer than the fine recesses.

12. A backlight unit characterized by including the light diffusing sheet according to claim 9 which has a thickness of 0.3-5 mm and has been disposed in front of a light source.

13. A backlight unit characterized by including the light diffusing sheet according to claim 9 which has a thickness of 0.3-5 mm and has been disposed in front of a light source, wherein the surface on the side of the light diffusing sheet opposite to the surface having fine recesses formed has recesses and protrusions which are finer than the fine recesses.

14. A light diffusing sheet comprising a light-transmitting resin, having a light emission side which is one surface and a light entrance side which is another surface, characterized by having fine recesses formed in the light emission side which is one surface, the fine recesses having a shape which is any of the shape of an inverted polyangular pyramid, the shape of an inverted truncated polyangular pyramid, the shape of an inverted cone, and the shape of an inverted truncated cone, wherein the bevel between the surface having fine recesses formed and each inclined face of each fine recess having the shape of an inverted polyangular pyramid or inverted truncated polyangular pyramid, or the bevel between that surface and the ridgeline of each fine recess having the shape of an inverted cone or inverted truncated cone is 35-70°;

the surface on the side opposite to the surface having fine recesses formed has recesses and protrusions which are finer than the fine recesses; and a functional layer having light-transmitting properties has been laminated to the surface on the side opposite to the surface having fine recesses formed and the functional layer having light-transmitting properties comprises an ultraviolet-absorbing layer and/or an antistatic layer.

15. A backlight unit characterized by including the light diffusing sheet according to claim 14 which has a thickness of 0.3-5 mm and has been disposed in front of a light source.

* * * * *